US006052084A

United States Patent [19]
Aoshima et al.

[11] Patent Number: 6,052,084

[45] **Date of Patent: *Apr. 18, 2000**

[54] VEHICLE-MOUNTED SATELLITE SIGNAL RECEIVING SYSTEM

[75] Inventors: Shigeki Aoshima, Susono; Tomohisa Harada, Nishikakamo-gun, both of Japan

[73] Assignee: Toyota Jidosha Kabushiki Kaisha, Toyota, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/864,114

[22] Filed: May 28, 1997

[30] Foreign Application Priority Data

May 29, 1996 [JP] Japan .................................... 8-134581

[51] Int. Cl.[7] ............................ H04B 7/185; H01Q 3/00

[52] U.S. Cl. ............................................ 342/358; 342/359

[58] Field of Search .............................. 342/359, 77, 358

[56] References Cited

U.S. PATENT DOCUMENTS

| | | | |
|---|---|---|---|
| 5,166,693 | 11/1992 | Nishikawa et al. | 342/359 |
| 5,173,708 | 12/1992 | Suzuki et al. | 342/359 |
| 5,241,319 | 8/1993 | Shimizu | 342/358 |
| 5,521,604 | 5/1996 | Yamashita | 342/359 |
| 5,557,285 | 9/1996 | Bender et al. | 342/359 |
| 5,629,709 | 5/1997 | Yamashita | 342/359 |
| 5,828,337 | 10/1998 | Aoshima et al. | 342/359 |

FOREIGN PATENT DOCUMENTS

| | | |
|---|---|---|
| 0 452 970 | 10/1991 | European Pat. Off. . |
| 0 555 586 | 8/1993 | European Pat. Off. . |
| 0 567 268 | 10/1993 | European Pat. Off. . |
| 0 685 705 | 12/1995 | European Pat. Off. . |
| 0 690 289 | 1/1996 | European Pat. Off. . |
| 63-262904 | 10/1988 | Japan . |
| 4-336821 | 11/1992 | Japan . |
| 5-142321 | 6/1993 | Japan . |
| 6-102334 | 4/1994 | Japan . |
| 6-104780 | 4/1994 | Japan . |
| 7-35636 | 2/1995 | Japan . |
| 95/20249 | 7/1995 | WIPO . |

OTHER PUBLICATIONS

Patent Abstracts of Japan vol. 17, No. 619 (P–1644), Nov. 15, 1993 & JP 05 196475 A (Japan Radio).

*Primary Examiner*—Gregory C. Issing
*Attorney, Agent, or Firm*—Pillsbury Madison & Sutro LLP

[57] ABSTRACT

A vehicle-mounted satellite signal receiving system adopting a satellite tracking system combining gyro tracking and hybrid tracking is disclosed which can correct a sensitivity coefficient for correcting a gyro sensor output signal to make up for a sensitivity error, even when a drift is produced in the sensitivity error. In this system, gyro tracking is caused when the received power level is above a threshold power level. The gyro tracking is done by determining the angular velocity ω of an antenna as ω=–(ωG×ΔSB+ωG from a value obtained by inverting the sign of the product of a gyro tracking angular velocity ωG and a sensitivity coefficient ΔSB for dealing with the sensitivity error and a predetermined offset error correction value ωG and setting the antenna to ω. When ΔSB is inaccurate and a sensitivity error is generated in the gyro sensor output signal, the received power level is reduced. When the received power level becomes lower than a threshold power level LB, the sensitivity coefficient is corrected on the basis of the sense of the angular velocity ωS in the hybrid tracking (step tracking) and in the gyro tracking.

15 Claims, 15 Drawing Sheets

BLOCK DIAGRAM OF BS TRACKING SYSTEM

STEP TRACKING BEAM ANTENNA

PLANAR BEAM TILT ANGLE

ΔωG : OFF-SET ERROR
ωS : ANGULAR VELOCITY OF STEP TRACK
ΔSB : SENSITIVITY COEFFICIENT

GYRO TRACKING ROUTINE

HYBRID TRACKING

OUTPUT IN HALT AT GIVEN TEMPERATURES IS MEASURED.
THE AMBIENT TEMPERATURE IS VARIED WITH THE ILLUSTRATED TEMPERATURE PATTERN. THE CHARACTERISTIC VARIES WITH PRODUCTS.

TEMPERATURE DRIFT

OUTPUT AT HALT IS MEASURED UNTIL 1 TO 10 sec AFTER TURNING ON SOURCE VOLTAGE IS MEASURED. THE CHARACTERISTIC VARIES WITH PRODUCTS.

TIME DRIFT

VEHICLE-MOUNTED SATELLITE SIGNAL RECEIVING SYSTEM

BACKGROUND OF THE INVENTION

1. Field of the Invention

This invention relates to vehicle-mounted satellite signal receiver systems and, more particularly, to a vehicle-mounted satellite signal receiving system which has a function of making up for a sensitivity error drift appearing in a satellite tracking gyro output signal.

2. Description of the Prior Art

Vehicle-mounted satellite signal receiving systems have heretofore been developed for receiving electromagnetic waves from a broadcasting satellite (hereinafter referred to as BS) or a communication satellite (hereinafter referred to as CS) by tracking the BS or CS (hereinafter typically referred to as BS) with an antenna. In such a system, when receiving signals from the BS, a position or bearing of a receiving antenna corresponding to the maximum received power level of the BS signal is found by rotating the antenna, and to maintain this maximum received power level an optimum antenna position is determined by sampling power level changes obtained while slightly changing antenna beam direction or angle (this system is often referred to as a step track system).

Such a system, however, cannot be used while the vehicle is moving, as it is now impossible to receive BS waves. To solve this problem, a BS tracking system has been proposed which uses a gyro or like yaw rate sensor for detecting the yaw rate of the vehicle and tracks the BS according to vehicle bearing changes determined from the angular velocity of the vehicle detected by the yaw rate sensor.

Japanese Laid-Open Patent Publication No. Hei 4-336821 discloses a vehicle-mounted BS signal receiver, which tracks the BS by directing the antenna toward the BS with a gyro sensor under a high electric field intensity condition while directing the antenna toward the BS by making use of the received wave power level peak under a low electric field intensity condition.

Japanese Laid-Open Patent Publication No. Sho 63-262904 also discloses a vehicle-mounted BS signal receiver.

Japanese Laid-Open Patent Publication Hei 5-142321 discloses a vehicle-mounted BS signal receiver which permits angle sensor calibration to enable control of the antenna direction toward the BS, even under wave-obstructed conditions, through use of an inexpensive angle sensor.

Japanese Laid-Open Patent Publication No. Hei 6-104780 discloses a system, which, after directing a receiving antenna in the maximum received power level direction, uses a gyro sensor to maintain the antenna altitude in a fixed direction according to the movement of the vehicle.

SUMMARY OF THE INVENTION

However, BS tracking systems using gyros or yaw rate sensors as described above sometimes fail to accurately track the BS. This results in BS signal reception failure when temperature or time changes during the running of the vehicle results in a temperature drift or the like in the offset error or sensitivity error of the gyro sensor output signal. In other words, a temperature drift (or time drift) generated in the gyro sensor output signal offset error or sensitivity error may cause a change in the gyro sensor output signal when the yaw rate is 0 deg/sec. FIGS. 15 and 16 show examples of the gyro sensor output signal offset error drift.

FIG. 15 is a graph showing results of actual measurements of temperature drift generated in the gyro sensor output signal. In this graph, the y axis shows the gyro sensor output voltage or temperature, while the x axis shows time. Illustrated are output voltage changes for three gyro sensors when the temperature is raised from +25° C. to 80° C. and then lowered to −30° C.

Like FIG. 15, FIG. 16 is a graph showing actual gyro sensor time drift measurement results. In this graph, the ordinate is used for the gyro sensor output voltage, and the abscissa is used for time. As is seen from the graph, the gyro sensor output voltage varies over time, even when the gyro sensor is held stationary. This graph, similar to FIG. 15, shows time drift measurements for three gyro sensors.

While FIGS. 15 and 16 only show drift in the offset error, similar drifts can be observed in the sensitivity error.

As shown above, the offset error and sensitivity error in the gyro sensor output signal vary with time or temperature. That is, the initial completely corrected offset error or sensitivity error varies with time. Therefore, the corrected offset error or corrected sensitivity error coefficient becomes inaccurate, resulting in a judgment that the vehicle is yawing to the left or right while it is in fact stationary.

The generation of an error in yaw rate detection due to variations of the offset error and sensitivity error may result in a departure from tracking at the time of the yawing of the vehicle. Also, the drift may fluctuates greatly according to the individual characteristics of a particular gyro sensor, causing the output voltage to vary with temperature and time.

A system is thus desired which would enable highly accurate BS tracking by accurately correcting the drift in the offset error or sensitivity error in the gyro sensor output signal. Concerning the drift correction of the offset error, among the offset error and sensitivity error, various inventions are shown in patent specifications filed by the same inventor and related to the current application. This application provides an invention which mainly permits sensitivity error drift correction.

Specifically, an object of the invention is to provide a vehicle-mounted BS signal receiver which can accurately track the BS by quickly and conveniently correcting the temperature drift and time drift of the gyro sensor sensitivity error.

To attain this object, a vehicle-mounted BS signal receiving system according to a first aspect of the invention comprises an antenna mounted on a vehicle, a gyro sensor for detecting the rotational angular velocity of the vehicle, a sensitivity error correcting means for correcting the output signal of the gyro sensor to make up for a sensitivity error of the output signal by multiplying the gyro sensor output signal by a sensitivity coefficient and outputting a corrected sensor output signal thus obtained, and a gyro tracking means for controlling the bearing of the antenna according to the corrected gyro sensor output signal, and sensitivity coefficient correcting means.

The sensitivity coefficient correcting means featured by the first aspect of the invention, corrects the sensitivity coefficient in the sensitivity error correcting means according to the received power level of BS signal received by the antenna Denoting the sensitivity error by SB and the true rotational angular velocity of the vehicle by $\omega_{TRUE}$ the output signal ωG of the gyro sensor is given as $$\omega G=(1+SB)\times\omega \text{TRUE} \quad (1)$$

This equation ignores the offset error. To cancel such sensitivity error SB, the gyro sensor output signal is corrected using a sensitivity coefficient ΔSB (=1/(1+SB)) as $$\omega G \times \Delta SB = \omega G \times (1/(1+SB)) = \omega_{TRUE} \quad (2)$$

When the correction of the sensitivity error of the gyro sensor output signal is imperfect, a higher or lower rotational angular velocity than the actual rotational angular velocity is detected with yawing of the vehicle. As a result, the antenna is rotated by a greater or smaller amount than the actual rotation of the vehicle, resulting in reduction of the received power level.

According to the first aspect of the invention, when the received power level is reduced at a certain gyro sensor output signal level (i.e., in the presence of yawing of the vehicle), it is determined that the correction of the sensitivity error is imperfect, and the sensitivity coefficient for correcting the gyro sensor output signal to make up for the sensitivity error thereof is corrected.

It will be seen that according to the first aspect of the invention, when the vehicle is yawing (i.e., at a certain gyro sensor output signal level), drifts in sensitivity error of the gyro sensor output signal which make it necessary to correct the correction coefficient are detected by detecting a received power level reduction.

In this configuration, the BS is tracked by "step tracking", but this invention is applicable to any tracking system as long as step tracking is adopted, for instance a tracking system adopting hybrid tracking, i.e., a combination of step tracking and gyro tracking, in lieu of step tracking.

To attain the above object, a vehicle-mounted satellite signal receiving system according to a second aspect of the invention comprises a vehicle-mounted antenna, a gyro sensor for detecting the rotational angular velocity of a vehicle, sensitivity error correcting means for correcting the output signal of the gyro sensor to make up for a sensitivity error of the output signal by multiplying the gyro sensor output signal by a sensitivity coefficient and outputting a correcting gyro sensor output signal thus obtained, gyro tracking means for controlling the bearing of the antenna according to the corrected gyro sensor output signal when the received power level of a satellite signal received by the antenna is above a first predetermined power level, and step tracking means for controlling the bearing of the antenna such that the received power level of the BS signal is increased when it is below a second predetermined level, and sensitivity coefficient correcting means.

According to the second aspect of the invention, when antenna bearing control by step tracking is caused as a result of a received power level reduction to a level below the second predetermined power level, the sensitivity coefficient correcting means controls the sensitivity coefficient in the sensitivity error correcting means by a predetermined amount of "increase" or a predetermined amount of "reduction" on the basis of the antenna rotation sense in the control by the step tracking means and the antenna rotation sense prevailed in the control by the gyro tracking means.

According to the second aspect of the invention, the sensitivity coefficient correcting means corrects the sensitivity coefficient ΔSB for correcting the gyro sensor output signal to make up for the sensitivity error therein on the basis of the antenna rotation sense through the control by the step tracking means and the antenna rotation means provided by the control of the gyro tracking means. It is thus possible to efficiently control the sensitivity error.

Specifically, whether the sensitivity of the gyro sensor is excessively low or excessively high can be determined by making use of the fact that the antenna rotation sense in the step tracking switched over from the gyro tracking is related to the sense of yawing of the vehicle independent of whether the gyro sensor sensitivity is high or low, as will be described.

If the gyro sensor sensitivity is low, the rotational angular velocity of the antenna is insufficient, and the antenna rotation sense in the step tracking is the same as the vehicle yawing sense. On the other hand, if the gyro sensor sensitivity is high, the rotational angular velocity of the antenna is excessive, the antenna rotation sense in the step tracking is opposite to the vehicle yawing sense. This fact is utilized to determine whether the gyro sensor sensitivity is excessively low or excessively high.

When the gyro sensor sensitivity is determined to be low, the sensitivity coefficient of the gyro sensor is increased. When the gyro sensor sensitivity is determined to be high, on the other hand, the sensitivity coefficient of the gyro sensor is reduced. It is thus possible to obtain heretofore difficult instantaneous sensitivity coefficient correction corresponding to the gyro sensor output signal sensitivity error drift.

To attain the above object, a vehicle-mounted BS signal receiving system according to a third aspect of the invention, which is based on the vehicle-mounted BS signal receiving system according to the first or second aspect of the invention, further comprises yaw rate calculating means for calculating the yaw rate of the vehicle. When and only when the yaw rate calculated by the yaw rate calculating means is above a first reference yaw rate Y1, the sensitivity coefficient correcting means corrects the sensitivity coefficient.

According to the third aspect of this invention, the sensitivity coefficient correcting means thus corrects the sensitivity coefficient when and only when the yaw rate of the vehicle is above a predetermined value.

This is based on a consideration that when the yaw rate of the vehicle is low, of the errors contained in the gyro sensor output signal, the offset error is greater than the sensitivity error because the offset error is intrinsically independent of the gyro sensor output signal. The sensitivity error is therefore contained in a fixed ratio to the magnitude of the gyro sensor output signal, so that the absolute value of the sensitivity error is greater than the output signal magnitude.

Using the above sensitivity error SB and the true rotational angular velocity ($\omega_{TRUE}$ of the vehicle, and also denoting the offset error by ωA, the gyro sensor output signal ωG is given as $$\omega G = \omega A + ((1+SB) \times (\omega_{TRUE} \quad (3)$$

When the yaw rate and $\omega_{TRUE}$ are both high, the error attributable to the sensitivity error SB in the total gyro sensor output signal error is increased. Conversely, when the yaw rate is low, the absolute value of the offset error ωA is greater than the sensitivity error and has greater influence in the total error. Therefore, in many cases when the yaw rate is low, it is difficult to determine whether or not to correct the gyro sensor output signal sensitivity coefficient In view of this fact, according to a third aspect of this invention, the sensitivity coefficient is not corrected when the yaw rate of the vehicle is low.

By adopting the means as described, it is possible to make the offset error less influential and permit efficient sensitivity coefficient correction.

To attain the above object, a vehicle-mounted BS signal receiving system according to a fourth aspect of the invention, which is based on the vehicle-mounted BS signal receiving system according to the third aspect of the invention, further comprises offset error correcting means for correcting the gyro sensor output to make up for an offset error by adding a predetermined offset error correction value to the gyro sensor output signal, and correction value correcting means for correcting the offset error correction value when and only when the yaw rate is below a second predetermined yaw rate Y2.

According to the fourth aspect of the invention, the offset error correction value is corrected when the yaw rate of the vehicle is below a predetermined value. For the offset error correction value correction, it is possible to adopt various methods proposed by the inventor in earlier patent applications related to the instant application by the applicant.

According to the third aspect of the invention, the sensitivity coefficient for dealing with the sensitivity error is corrected when the yaw rate of the vehicle is high. According to the fourth aspect of the invention, in addition to this correction, the offset error correction value is corrected when the yaw rate is low. It is thus possible to effectively cancel error drifts appearing in the gyro sensor output signal.

To attain the above object, a vehicle-mounted BS signal receiving system according to the invention, which is based on the vehicle-mounted BS signal receiving system according to the fourth aspect of the invention, further comprises first reference yaw rate updating means for updating either one or both of the first and second reference yaw rates Y1 and Y2 according to the extent of converging of the offset error correction value.

According to a fifth aspect of the invention, as in the fourth aspect, when the yaw rate of the vehicle is above a predetermined value, the sensitivity coefficient for dealing with the gyro sensor output signal sensitivity error is corrected, and when the yaw rate of the vehicle is below the reference yaw rate Y, the offset error correction value is corrected. In addition, according to the fifth aspect of the invention, the first reference yaw rate updating means updates the reference yaw rate Y according to the status of converging of the Offset error.

The converging of the offset error correction value reduces the ratio of the offset error in the total gyro sensor output signal error, thus relatively increasing the ratio of the sensitivity error. Generally, the converging of the offset error increases the ratio of the sensitivity error to the total gyro sensor output signal error. It is thus possible to correct the sensitivity coefficient to make up with the sensitivity error regardless of the offset error. It is thus generally desirable to set the reference yaw rate Y to decrease as they offset error correction value converges.

Under the above principles, according to the fifth aspect of the invention, the reference yaw rate Y, which is a criteria as to whether to correct the offset error correction value or to correct the sensitivity coefficient for dealing with the sensitivity error, is updated according to the converging of the offset error correction value. This arrangement permits earlier converging of the sensitivity coefficient for dealing with the sensitivity error contained in the gyro sensor output signal.

The extent of the converging of the offset error correction value is suitably determined according to the offset error correction value correction cycle.

To attain the above object, a vehicle-mounted BS signal receiving system according to a sixth aspect of the invention, which is based on the vehicle-mounted BS signal receiving system according to the invention, is such that the sensitivity coefficient correcting means corrects the sensitivity coefficient when and only when the time during which the received power level is above a third predetermined power level is longer than a predetermined time.

According to the sixth aspect of the invention, the sensitivity coefficient for dealing with the gyro sensor output signal sensitivity error is corrected when and only when the time during which the received power level is above a third predetermined power level is longer than a predetermined time.

In a vehicle-mounted BS signal receiving system, temporary reductions in the received power level to below a predetermined power level may be caused by an obstruction such as a tree or the like. Such is not the case when the received power level is reduced to below the predetermined level due to sensitivity error generation. It is therefore inadequate in such a case to correct the sensitivity coefficient for dealing with the sensitivity error. According to sixth aspect of the invention, the sensitivity coefficient for dealing with the sensitivity error is not corrected when the received power level drops below the predetermined power level for only an extremely short period of time, as perhaps caused by the blocking of the signal by trees or the like.

Since inadequate correction of the sensitivity coefficient does not occur in the sixth aspect of the invention, it is possible to obtain accurate sensitivity coefficient correction.

A vehicle-mounted BS signal receiving system according to a seventh aspect of the invention, which is based on the vehicle-mounted BS signal receiving system according to the second aspect of the invention, further comprises rolling/pitching detecting means for detecting rolling or pitching of the vehicle.

In the vehicle-mounted BS signal receiving system according to the seventh aspect of the invention, the sensitivity coefficient correcting means corrects the sensitivity coefficient when and only when the rolling/pitching means does not detect any rolling or pitching.

According to the second aspect of the invention, the sensitivity coefficient for dealing with the sensitivity error is corrected when the step tricking is caused with the reduction of the received power level being below a predetermined power level for the following ground.

It is determined that the received power level reduction being below a predetermined power level is due to generation of a sensitivity error (i.e., the sensitivity error SB being not zero). In other words, it is determined that the bearing of the antenna has deviated from the bearing of the BS due to generation of a sensitivity error or an inaccurate sensitivity coefficient for dealing with the sensitivity error (the sensitivity coefficient ΔSB being not accurately 1/(1+SB)).

According to the second aspect of the invention, under the above principle the sensitivity coefficient for dealing with the sensitivity error is corrected on the basis of the antenna rotation sense in the step tracking and that prevailed in the gyro tracking when the received power level is reduced to below a predetermined power level. It is thus possible to obtain automatic correction of the gyro sensor output signal to make up for the sensitivity error therein while the BS signal is received.

The reduction of the received power level to below a predetermined power level, however, does not only result from the presence of a sensitivity error or imperfect correction For example, according to the sixth aspect of the invention, the sensitivity coefficient for dealing with the sensitivity error is not corrected in the case of received power level reduction due to blocking of a BS signal by trees or the like while the vehicle is in motion. Generally, the sensitivity coefficient for dealing with when the received power level was reduced below a predetermined power level only once during a predetermined past time period before a sensitivity coefficient correction timing.

Furthermore, since the vehicles generally yaw, the received power reduction may be caused by a deviation of the bearing of the antenna and that of the BS from each other due to inclination of the vehicle to the left or right.

Accordingly it is appropriate to make no sensitivity coefficient correction in the case of reduced power level reduction due to inclination of the vehicle. According to the seventh aspect of the invention, the rolling/pitching detecting means is provided to prohibit the sensitivity coefficient correction, even when the received power level is reduced to be below a predetermined value, so long as the detected value of the rolling/pitching of the vehicle is above a predetermined value.

With this arrangement, it is possible to ensure accurate correction of the offset error correction value irrespective of the inclination of the vehicle.

To attain the above object, a vehicle-mounted BS signal receiving system according to an eighth aspect of the invention, which is based on the vehicle-mounted BS signal receiving system according to the second aspect of the invention, further comprises correction unit setting means for setting a correction unit Act for correction of the sensitivity coefficient by the sensitivity coefficient correcting means according to the extent of converging of the sensitivity coefficient.

According to the second aspect of the invention, the sensitivity coefficient ΔSB for dealing with the sensitivity error is corrected on the basis of the antenna rotation sense in the step tracking and that prevailed in the gyro tracking. As for the specific "amount" of correction in this case, excessive correction results in excessive gyro sensor output signal correction to make up for the sensitivity error. Insufficient correction, on the other hand, results in long converging time. Generally, however, when the sensitivity error is large, excessive correction is less liable. Thus, in this case it is desirable to set a large correction unit from the standpoint of the quick converging of the sensitivity coefficient. When the sensitivity coefficient is converging, on the other hand, it is desirable to set a small correction unit from the standpoint of preventing the excessive correction.

According to the eighth aspect of the invention, the correction amount is determined according to the extent of converging of the sensitivity coefficient for dealing with the sensitivity error. Specifically, the correction amount is set smaller for more progressed converging. Conversely, the greater correction amount is set when the converging is more imperfect. Thus, when the converging is imperfect so that the error is still large, the correction amount is large to permit quick converting of the sensitivity coefficient and also converging to accurate sensitivity coefficient.

The extent of converging may be quantitatively expressed in various ways. It is suitably determined by the length of the correction cycle.

To attain the above object, a vehicle-mounted BS signal receiving system according to a ninth aspect of the invention, which is based on the vehicle-mounted BS signal receiving system according to either the first or the second aspect of the invention, further comprises offset error correcting means for correcting the gyro sensor output signal to make up for the offset error thereof by adding a predetermined correcting correction value to the gyro sensor output signal, offset error correction value correcting means for correcting said correction value, and control means for starting the sensitivity coefficient correcting means after the correction of the offset error correction value has been covered.

According to the ninth aspect of the invention, in addition to the sensitivity coefficient correcting means, the offset error correction value correcting means is provided for correcting the gyro sensor output signal offset error correction value, and after power-"on"0 the offset error correction value is corrected.

When the correction of the offset error correction value is imperfect, gyro sensor output signal contains an offset error in addition to a sensitivity error.

It is usually very difficult to make the sensitivity error and offset error distinct from each other. In many cases, therefore, it is inadequate to individually correct the sensitivity coefficient and the correction of the offset error. The sensitivity error in the gyro sensor output signal is proportional to the magnitude thereof, while the offset error always has a fixed magnitude in the gyro sensor output signal.

According to the ninth aspect of the invention, the control means first starts the offset error correction value correcting means for correcting the offset error correction value. The sensitivity coefficient is corrected after the offset error correction value correction has been converged.

According to a tenth aspect of the invention, substantially similar construction as according to the ninth aspect of the invention is provided with the difference that the tenth aspect of the invention refers to the fourth aspect of the invention on the basis of the first aspect of the invention, whereas the ninth aspect of the invention refers to the second aspect of the invention.

To attain the above object, a vehicle-mounted BS signal receiving system according to an eleventh aspect of the invention, which is based on the vehicle-mounted BS signal receiving system according to either the first or the second aspect of the invention, further comprises control means for reducing the frequency of correcting the sensitivity coefficient after completion of the correction of the sensitivity coefficient by the sensitivity coefficient correcting means.

After the sensitivity coefficient for dealing with the gyro sensor output signal sensitivity error has been converged to a predetermined value, the sensitivity coefficient is corrected when the received power level is reduced even sightly. This means a possible sensitivity error increase. Accordingly, it is desirable to provide different sensitivity coefficient updating processes before and after the converging of the sensitivity coefficient. According to an eleventh aspect of the invention, the sensitivity coefficient correction frequency is set differently before and after the sensitivity coefficient converging. Specifically, the correction frequency is suitably reduced after converging. Reducing the correction frequency in this way has an effect of preventing an error increase after the converging.

While according to this invention the correction frequency is updated, it is also suitable to update the sensitivity coefficient correction unit. Reducing the correction unit makes it difficult to correct the sensitivity coefficient.

To attain the above object, a vehicle-mounted BS signal receiving system according to a twelfth aspect of the invention, which is based on the vehicle-mounted BS signal receiving system according to the third aspect of the invention, further comprises second reference yaw rate updating means for updating the reference yaw rate Y according to the extent of converging of the sensitivity coefficient.

The reference yaw rate is a criteria of determining which of the sensitivity error and the offset error is greater in the gyro sensor output signal. Thus, when the sensitivity error becomes relatively smaller as the converging of its correction proceeds, the reference yaw rate should be correspondingly updated. That is, the reference yaw rate should be updated so that the greater of the sensitivity error and the offset error is correctly expressed.

To attain the above object, a vehicle-mounted BS signal receiving system according to a thirteenth aspect of the invention, which is based on the vehicle-mounted BS signal receiving system according to the eighth aspect of the invention, further comprises correction unit increasing means for increasing the correction unit when Δα the correction of the sensitivity coefficient for dealing with the sensitivity error per unit time is mostly in either an "increase" or a "reduction" direction.

The sensitivity coefficient correcting means instantaneously corrects the sensitivity coefficient ΔSB for dealing with the sensitivity error. This correction is done by "increasing" or "reducing" the sensitivity coefficient by adding or subtracting the correction unit Δα for one correction time to or from the sensitivity coefficient.

This correction is continued until the sensitivity coefficient is perfectly converged. When the correction is mostly in the "increase" direction, i.e., is done mostly through addition, it is adequate to judge that the converging of the sensitivity coefficient is slow. In such a case, the correction unit Δα per one time of correction is suitably increased to provide for quicker converging. The same consideration applies to a case when the correction is mostly in the "reduction" direction, i.e., done mostly through subtraction.

Thus, when the correction of sensitivity coefficient is mostly either in the "increase" or the "reduction" direction, it is suitable to judge that the converging of the sensitivity coefficient is slow and increase the correction unit ha for one time of the sensitivity coefficient correction. By increasing the correction unit ha in this way, converging of the sensitivity coefficient can be accelerated.

When the correction of the sensitivity coefficient mostly in either direction has been released, reducing the correction unit Act can achieve highly accurate converging.

To attain the above object, a vehicle-mounted BS signal receiving system according to a fourteenth aspect of the invention, which is based on the vehicle-mounted BS signal receiving system according to the fourth aspect of the invention, features that the first and second reference yaw rates are the same.

According to the fourth aspect of the invention, a single reference yaw rate is used to permit simpler angular velocity determination.

To attain the above object, a vehicle-mounted BS signal receiving system according to a fifteenth aspect of the invention, which is based on the vehicle-mounted BS signal receiving system according to the twelfth aspect of the invention, features that the first and second reference yaw rates are the same.

According to the fifth aspect of the invention, a single reference yaw rate is used to permit simpler angular velocity determination.

DESCRIPTION OF THE PREFERRED EMBODIMENT

A preferred embodiment of the invention will now be described with reference to the drawings.

A. Basic Embodiment

A-1 Description of the basic embodiment

Figure 1:
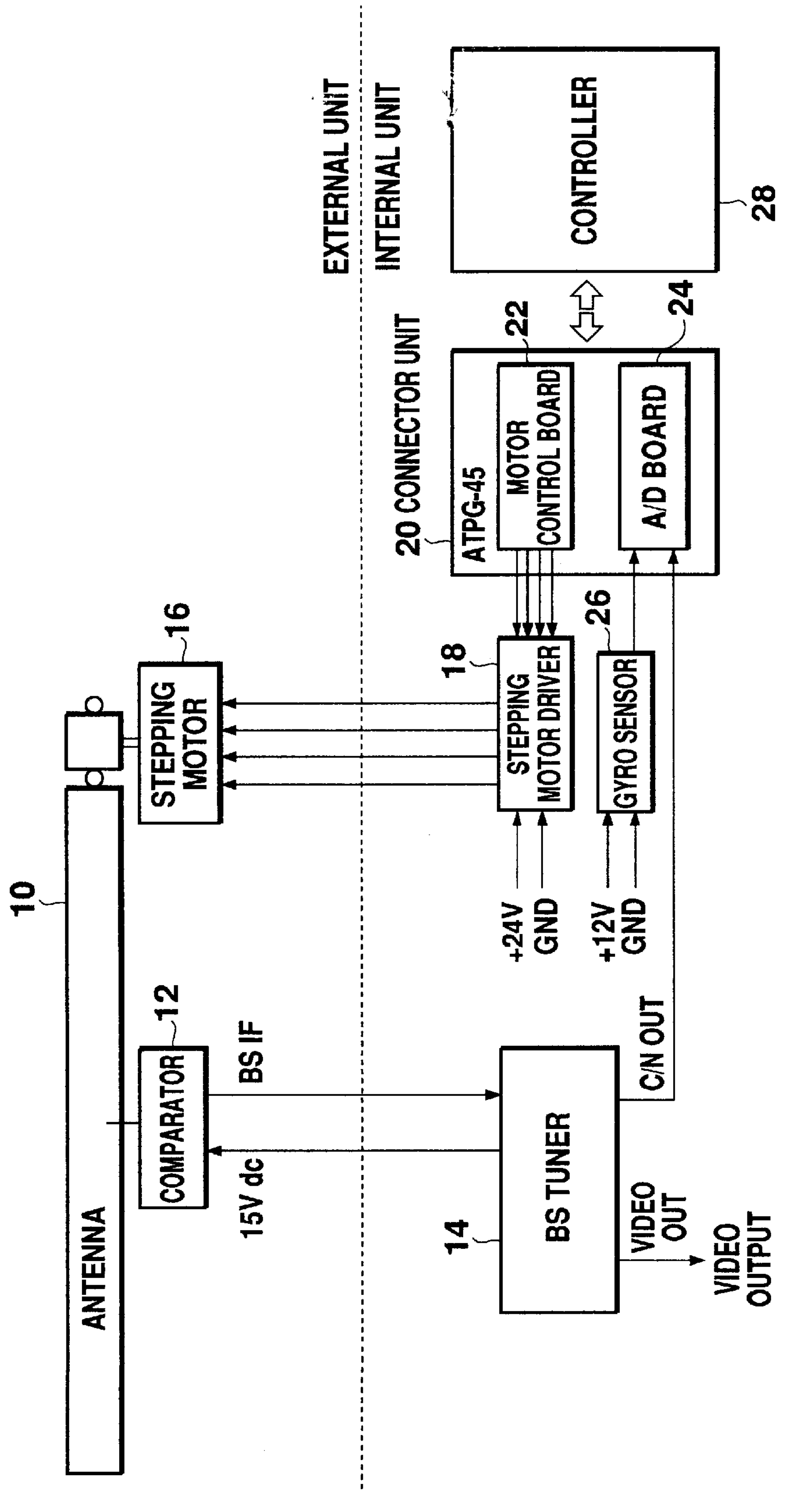
FIG. 1 is a block diagram showing a vehicle-mounted BS signal receiving system with a BS tracking function.

FIG. 1 is a block diagram showing a vehicle-mounted BS signal receiving system with a BS tracking function embodying the invention. As shown in the figure, an antenna (BS signal antenna) 10 is connected via a converter 12 to a BS tuner 14 provided inside a vehicle. The antenna 10 and converter 12 are provided as an external unit outside the vehicle. A stepping motor 16 is mounted on the antenna 10, and it can change the bearing of the antenna 10. The stepping motor 16 is driven by a stepping motor driver 18 which is included in the external unit and is controlled by a motor control board 22 of a connector unit 20. The connector unit 20 includes an A/D board 24 in addition to the motor control board 24. The A/D board 24 receives an output signal of a gyro sensor 26 and a C/N signal from the BS tuner 14. The A/D board 24 has a function of converting the received analog signals into digital signals. A controller 28 is connected to the connector unit 20, and according to its signals the motor control board 22 controls the stepping motor 16 via the stepping motor driver 18. The controller 28 also executes various controls such as gyro tracking and step tracking as will be described later by checking digital signal output of the A/D board 24.

In this construction, after power-"on", the controller 28 checks the present received power level of BS signal. This check of the received power level is done by checking the C/N signal output of the BS tuner 14 through the A/D board 24. When it is found as a result of the received power level check that the received power level is below a predetermined threshold power level, the controller 28 determines that the bearing (or bearing angle) of the antenna 10 is different from the bearing of the BS, and executes an initial search. When the controller 28 finds that the received power level is above the predetermined threshold power level, it determines that the bearing angle of the antenna 10 is substantially coincident with the bearing of the BS, and executes tracking.

In the initial search, the controller 28 rotates the antenna 10 at a high speed while monitoring the received power level. When the received power level becomes lower than the threshold power level, the controller 28 stops the antenna 10, and executes tracking as will be described later.

In the tracking operation, the controller 28 reads the received power level and the output signal of the gyro sensor 26 and controls the bearing of the antenna 10. The output signal of the A/D board 24 has been converted in the A/D board 24 into a digital signal before being supplied to the controller 28. The controller 28 executes gyro tracking and step tracking adequately according to digital signals supplied to it.

The initial search operation suitably consists of two stages, i.e., a high speed stage and a low speed stage. After power-"on", the controller 28 rotates the antenna a large amount and continues rotating the antenna until the received power level is increased. When the received power level once increased is reduced, the controller 28 goes to the low speed search stages to rotate the antenna slowly and accurately grasp a maximum received power level point.

As described above, the tracking operation is executed as gyro tracking or step tracking. The gyro tracking is a process of control to direct the antenna towards the BS by rotating the antenna 10 at an angular velocity −ωG, which is equal in magnitude to and opposite in sign to the angular velocity of yawing (ωG) of the vehicle ,is detected by the gyro sensor.

In such gyro tracking, the angular velocity of the antenna rotation can be controlled smoothly with bearing angle changes of the vehicle due to vehicle yawing, and the load on the stepping motor 16 is not changed suddenly, so that it is possible to track the BS satisfactorily, even when the vehicle undergoes yawing at a comparatively high speed. However, as described before, the output signal of the gyro sensor may contain an offset error or a sensitivity error. Denoting the offset error by ωA, the sensitivity error by SB and the true rotational angular velocity of the vehicle by $\omega_{TRUE}$, the gyro sensor output signal ωG is given as $$\omega G=\omega A+((1+SB)\times\omega_{TRUE})) \quad (4)$$

To cancel these errors and thus obtain the true rotational angular velocity of the vehicle, a correction value and a correction coefficient for cancelling the offset error and sensitivity error are necessary. Denoting the offset error correction value by ΔωG (=−ωA) and the correction coefficient for dealing with the sensitivity error by ΔSB (=1/(1+SB), the true rotational angular velocity of the vehicle $\omega_{TRUE}$ is calculated from the gyro sensor output signal ωG as $$(\omega G+\Delta\omega G)\times\Delta SB=((1+SB)\times\omega_{TRUE}\times\Delta SB=\omega_{TRUE} \quad (5)$$

The offset error and sensitivity error in the gyro sensor output signal may further contain temperature and time drifts. Furthermore, the amount of control, by which the antenna 10 is rotated by the stepping motor 16, and the actual rotational angular velocity of the antenna 10 may deviate from each other. Usually, it is necessary to re-direct the beam of the antenna 10 toward the BS using some means. In the gyro tracking, usually the control interval, i.e., the interval Δt of detection of the angular velocity of the yawing of the vehicle, is desirably shorter because a shorter control interval At allows the bearing angle error of the antenna 10 to be made smaller when angular velocity of yawing is suddenly changed.

Figure 2:
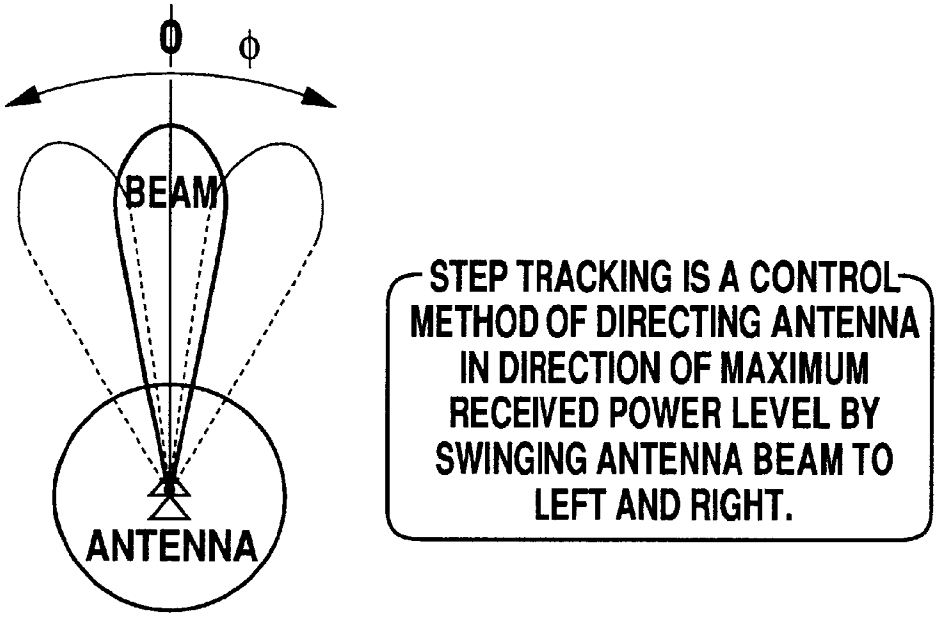
FIG. 2 is a view illustrating the principles underlying step tracking.

The step tracking is a process in which the upper limit of the received power level is checked by causing slight swinging of the antenna beam bearing and the antenna beam bearing is directed toward the BS by rotating the antenna 10 in the sense of increasing the received power level. FIG. 2 illustrates the principles underlying the step tracking. The controller 28 reads the received power level through the A/D board 24 at a fixed interval ΔT, and, when the received power level is higher than that before time ΔT, it continually rotates the antenna 10 in the same sense as before time ΔT at a constant angular velocity ωS. When the received power level is lower than before time ΔT, the controller 28 causes rotation of the antenna 10 in the opposite sense to that before time ΔT at the constant angular velocity ωS. The angular velocity ωS in the step tracking is called step rate. In the step tracking, the angular velocity ωS should be nearly the angular velocity of quick yawing of the vehicle to be above to follow up that yawing because rotation of the antenna 10 caused at an angular velocity ωS lower than the maximum angular velocity of yawing of the vehicle may not be sufficient to deal with the yawing of the vehicle. In the actual system, however, the rotary portion has moment of inertia, and it is difficult to cause quick step rotation. Therefore, quick yawing of the vehicle frequently fails to be followed up.

In the step tracking, when the control interval ΔT is short, the change (i.e., detected change) in the received power level is low. In this case, failure of accurate detection of the controlled sense of rotation may result from thermal noise, and in the extreme case the beam bearing of the antenna 10 may be completely deviated from the bearing of the BS. Accordingly, the control interval ΔT, the interval of the received power level detection in the step tracking, should have a certain length.

Figure 3:
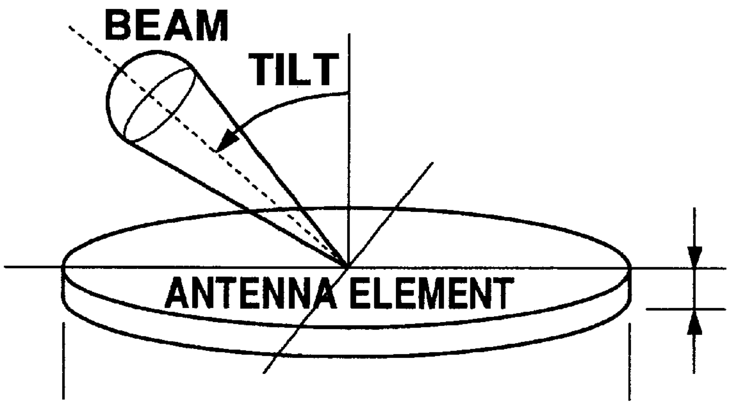
FIG. 3 is a view showing a planer beam tilt antenna.
Figure 4:
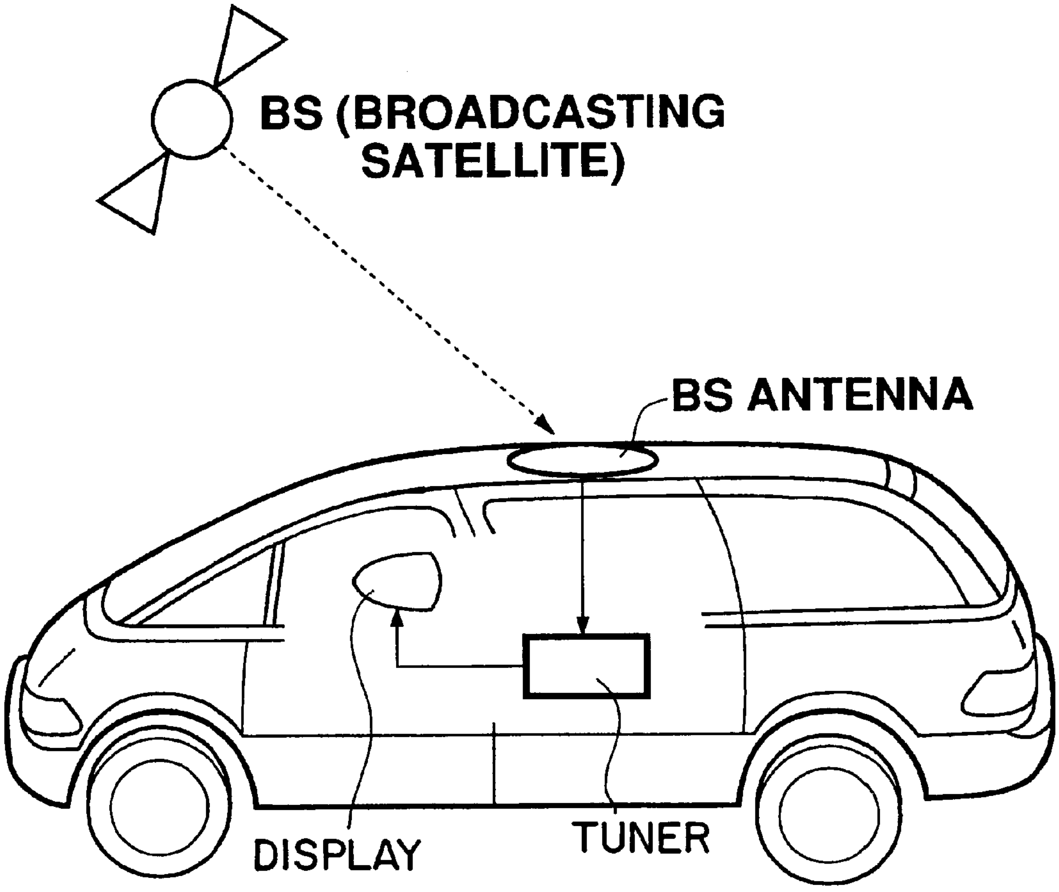
FIG. 4 is a view showing the manner in which the planar beam tilt antenna is mounted on a vehicle roof.

In this embodiment, the antenna used may be of any type but must have a fixed directivity. FIG. 3 shows a suitable planar beam tilt antenna. This planar beam tilt antenna is a planar antenna, the beam of which can be tilted by a fixed angle from a direction normal to its element through phase control thereof. The directivity of the antenna is in a fixed direction as shown in FIG. 3. However, since the BS or CS has a fixed altitude, it is theoretically possible to direct the antenna toward the BS or CS merely by rotating the planar antenna shown in FIG. 3 in a horizontal plane so long as the vehicle is moving in a horizontal direction. Such a planar antenna can be constructed as a thin antenna to be provided on the roof of a vehicle (i.e., a car) as shown in FIG. 4. It is of course suitable to provide the planar antenna in a sun roof.

Gyro tracking and step tracking have merits and demerits as described above. Accordingly, control adopting the gyro tracking and step tracking in combination, i.e., a method of control, in which changes in the antenna beam bearing due to yawing of the vehicle are cancelled using a gyro sensor output while cancelling antenna bearing changes which could not have been canceled with the gyro sensor output by using the step tracking control, has been broadly proposed. The tracking system combining the gyro tracking and the step tracking is also adopted in the BS tracking function in this embodiment In this specification, this combination method is referred to as hybrid tracking.

In hybrid tracking, the antenna 10 is rotated by using the sum (−ωG+ωS) of a value −ωG obtained by inverting the sign of the angular velocity ωG of the yawing vehicle as detected by the gyro sensor 26 and a value ωS obtained by multiplying a constant angular velocity |ωS| by a sign (either positive or negative) determined by the magnitude relation between the received power level (i.e. C/N signal) before time ΔT and the present received power level. The step rate ωS has a predetermined absolute value and can take either plus or minus sign.

In the hybrid tracking control (i.e., control combining the gyro tracking and step tracking), the controller 28 reads the output signal of the gyro sensor 26 through the A/D board 24 for every time Δt, and determines the rotational angular velocity of the antenna 10 by superimposing the control amount ωS (i.e.,+|ωS| or −|ωS|) on the value obtained by inverting the sign of the gyro sensor output signal (representing the rotational angular velocity of the vehicle).

The control amount +|ωS| or −|ωS| for the step tracking is updated for every time ΔT. The control interval (or time) T for the step tracking is selected to be ΔT=M×Δt (M being an integer). That is, the control interval (or time) ΔT for the step tracking is set to an integral multiple of the control interval (or time) t for the gyro tracking. For example, in this embodiment M is set to 6, that is, ΔT is six times Δt. As described before, the control interval Δt for the gyro tracking is desirably as short as possible. On the other hand, the control interval ΔT for the step tracking should have a certain length in order to obtain stable control. For this reason, ΔT is set to be longer than Δt.

Thus, in the hybrid tracking control (combining the gyro tracking and the step tracking), the merits of both the tracking controls are provided, and it is expected to realize satisfactory tracking of the BS even from a quickly yawing vehicle.

In the BS tracking system which make use of the merits of both controls, temperature and time drifts are still present in the respective sensitivity error and offset error, in the gyro sensor output. In such a combination control, therefore, a process is desired, which can instantaneously correct the output of the gyro sensor 26 to make up for the sensitivity error and the offset error.

This invention involves a system which can instantaneously correct the sensitivity coefficient for dealing with the gyro sensor output signal sensitivity error when a drift is generated therein so that the sensitivity error can always be accurately made up for in correspondence to such a drift. The correction of the offset error correction value in correspondence to a drift of the offset error was proposed in a separate patent application by the applicant related to this application.

While in the specification the correction of the sensitivity coefficient corresponds to the sensitivity error drift, it is also possible to relate the correction of the sensitivity coefficient for dealing with the gyro sensor output signal sensitivity error with the correction of the offset error correction value for dealing with the offset error. This application also proposes such a system of setting the correction of the sensitivity coefficient for dealing with the sensitivity error and the correction of the correction value for dealing with the offset error in relation to each other.

A-2 Principles underlying the basic embodiment

The basic embodiment seeks to permit accurate BS tracking through automatic correction of the sensitivity coefficient in correspondence to a drift thereof while the BS is tracked by the hybrid tracking. To attain this object, in the basic embodiment of the invention, when a transition between the step tracking and the hybrid tracking arises in the tracking operation, the cause is judged to be the presence of a sensitivity error (insufficient compensation for the sensitivity error), and the sensitivity coefficient is corrected by "increasing" or "reducing" the sensitivity error by a predetermined amount based on the relation between the sense of restoration of the step tracking by hybrid control and the antenna rotation sense.

The hybrid tracking (or control) in the embodiment will first be described.

Figure 5:
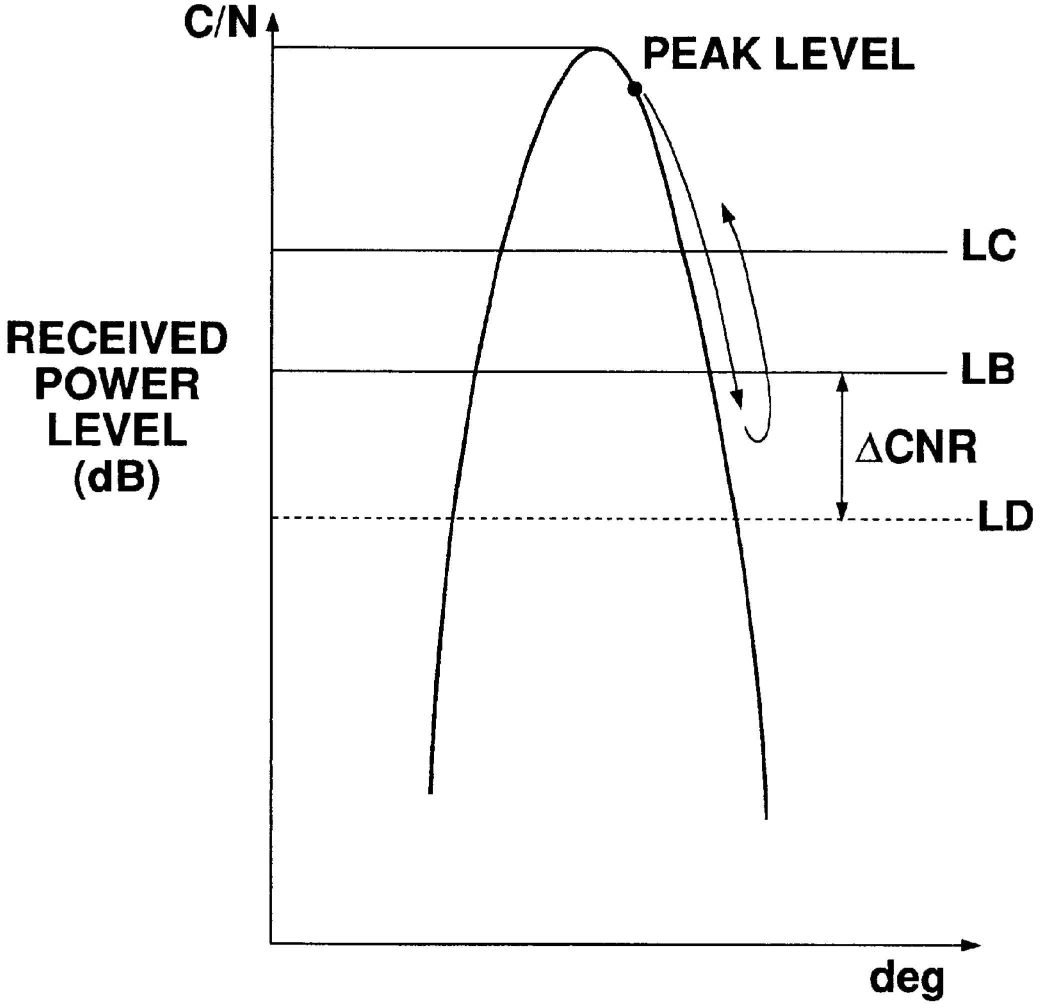
FIG. 5 is a graph showing the relation between received power level and deviation of antenna beam from BS bearing.

Referring to FIG. 5, this embodiment proposes a method of correcting the sensitivity coefficient for dealing with the gyro sensor output signal sensitivity error when a sensitivity error drift is generated in a BS tracking system which performs tracking according to the sole gyro sensor output when the received power level is above a threshold power level LC, while adopting hybrid tracking according to a C/N output when the received power level is below the threshold power level LB. In connection with the embodiment, rather than stringent step tracking, a form of hybrid tracking combining the gyro tracking and step tracking is employed, as will be described. While this embodiment describes hybrid tracking, other tracking methods, as well as pure step tracking, are covered in the scope of the invention as long as a step tracking component is involved.

In the description of the embodiment, a threshold level of transition from the gyro tracking at a high received power level to the hybrid tracking due to a received power level reduction is referred to as LB, and a threshold level of transition from the hybrid tracking to the gyro tracking due to a received power level increase is referred to as LC.

A received power level where the gyro tracking prevails is shown by a block dot in FIG. 5. When the sensitivity error in the output signal of the gyro sensor 26 has a drift, yawing of the vehicle causes a shift of the received power level point to the right or left several seconds later. As a result, the receive power level becomes lower than the threshold LB triggering the hybrid tracking (or step tracking). This is brought about as a result of the failure of correct detection of the angular velocity of the yawing vehicle due to generation of a drift of the sensitivity error of the output signal of the gyro sensor 26.

Figure 6:
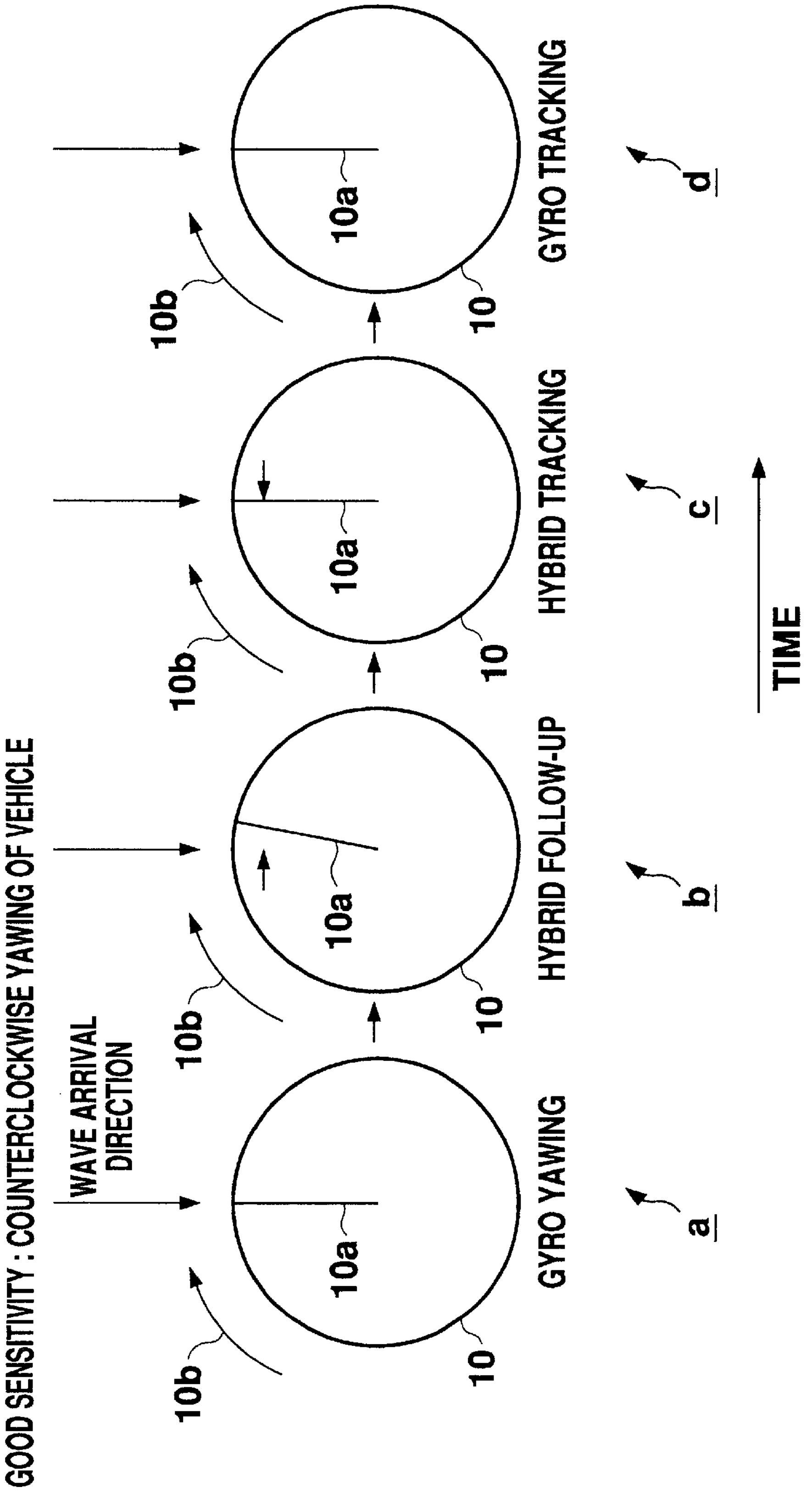
FIG. 6 is a view for explaining the principles underlying the sensitivity coefficient correction in the vehicle-mounted BS signal receiving system embodying the invention.

Since the hybrid tracking has a restoring force, in this tracking the antenna 10 is rotated to the higher C/N signal level side. Thus, the received power level exceeds the threshold LC, triggering the gyro tracking once again. FIG. 6 illustrates an example of operation of sensitivity coefficient correction in a case when the gyro sensor sensitivity is excessively high with a drift in the sensitivity error, i.e., when the rotational angular velocity of the vehicle is judged to be higher than the actual value.

As shown in a in FIG. 6, the bearing 10*a* of the antenna 10 is initially coincident with the wave arrival direction.

At this time, the antenna 10 is rotated in the CW (clockwise) sense 10*b*, while the vehicle is rotated in the CCW (counterclockwise) sense. In this case, the bearing 10*a* of the antenna is always coincident with the wave arrival direction. When the sensitivity of the gyro sensor 26 is excessively high, however, the rotational angular velocity of the vehicle is judged to be higher than the actual value. Consequently, the rotational angular velocity of the antenna becomes higher than that of the vehicle. This results in excessive CW rotation of the antenna 10 although the vehicle is undergoing CCW rotation, and the bearing 10*a* of the antenna is separated from the wave arrival direction, as shown in b in FIG. 6.

When the received power level is reduced to be below the threshold power level LB due to progressive departure of the bearing 10*a* of the antenna, hybrid tracking is triggered.

Since the hybrid tracking has a restoring force to cause rotation of the antenna in the higher received power level sense, the bearing 10*a* of the antenna can be brought into coincidence with the wave arrival direction again, as shown in c in FIG. 6. Consequently, the received power level of the BS signal again surpasses the threshold LC, thus triggering gyro tracking again (see d in FIG. 6).

As shown, when the sensitivity of the gyro sensor 26 is excessively high (that is, when it is too sensitive), the antenna 10 is rotated in the opposite sense to its rotation in the step tracking (including the hybrid tracking).

While the case when the sensitivity of the gyro sensor 26 is excessively high has been described in connection with FIG. 6, when the sensitivity of the gyro sensor 26 is excessively low (that is, when the gyro sensor is too insensitive), the rotational angular velocity of the antenna 10 is insufficient. Consequently, the antenna 10 is rotated in the same sense as in the step tracking (including the hybrid tracking).

As shown above, when the gyro tracking is switched over to the hybrid tracking, the sense or rotation of the antenna 10 and the rotation sense in the step tracking in the hybrid tracking are compared. When the two senses are the same, a judgment is made that the sensitivity of the gyro sensor 26 is excessively low, and the sensitivity coefficient is increased by a predetermined amount. On the other hand, when the two senses are opposite, a judgment is made that the sensitivity of the gyro sensor 26 is excessively high, and the sensitivity coefficient is reduced by a predetermined amount.

Figure 7:
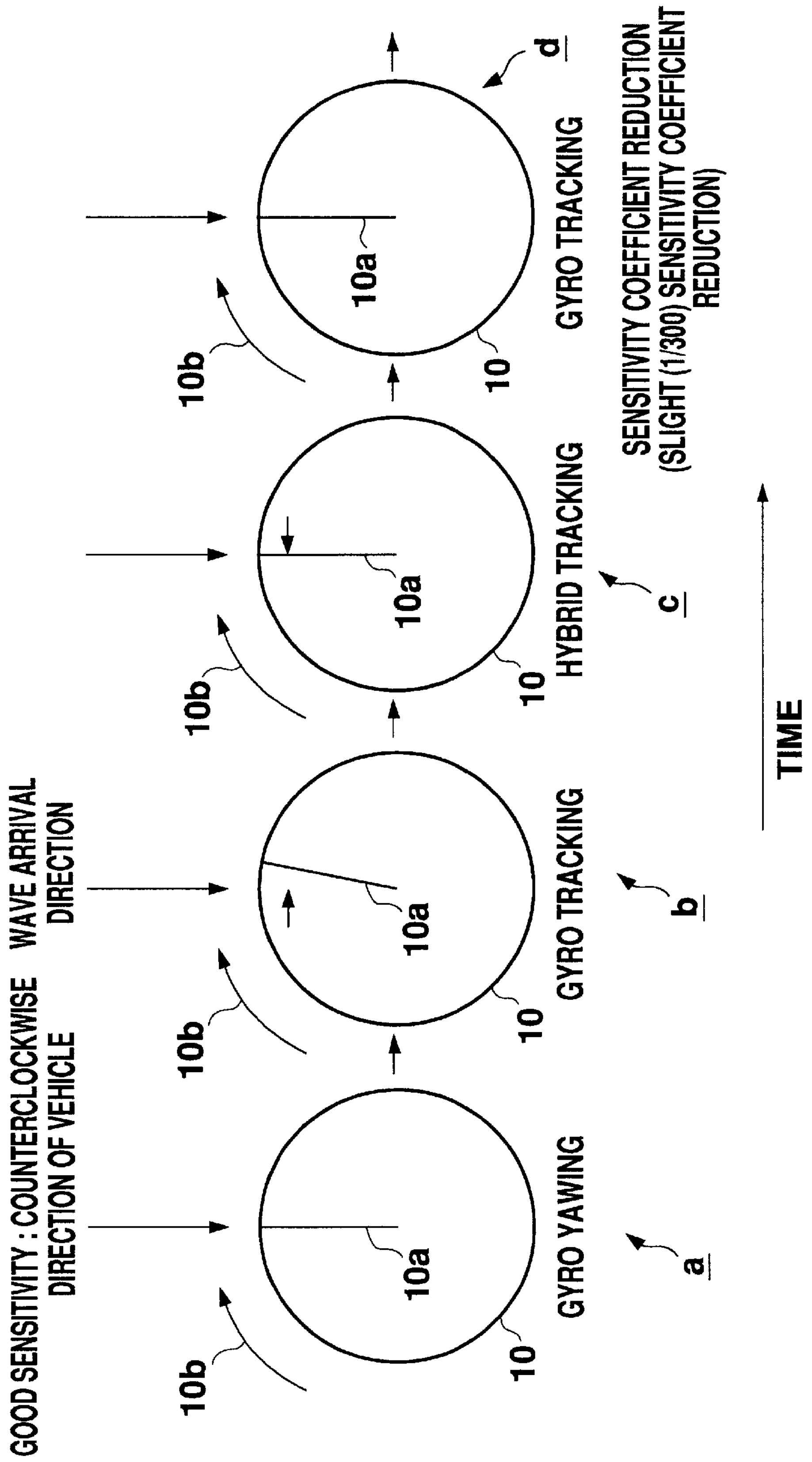
FIG. 7 is a view for explaining the principles underlying the sensitivity coefficient correction in the vehicle-mounted BS signal receiving system embodying the invention.

FIG. 7 illustrates the operation of sensitivity coefficient correction in a case of reducing the sensitivity coefficient by a predetermined amount when the sensitivity of the gyro sensor 26 is excessively high. Situations shown in a and b in FIG. 7 are entirely the same as in the case of FIG. 6. Also, as in the case of FIG. 6, when the received power level is reduced to be below the threshold LB, the gyro tracking is switched over to the hybrid tracking (see c in FIG. 7).

A feature of the example shown in FIG. 7 is that the sensitivity coefficient for dealing with the gyro sensor sensitivity is corrected when the hybrid tracking is triggered. In this example, when the hybrid tracking is triggered, this is judged to be due to imperfect sensitivity coefficient correction, and a sensitivity coefficient correction is done. The correction amount in this example is as small as about 1/300 of the sensitivity coefficient.

As shown in FIG. 6 or 7, when the sensitivity coefficient correction is imperfect, yawing of the vehicle causes switching of the gyro tracking over to the hybrid tracking. Whenever this switching is brought about, the sensitivity coefficient may be corrected by about 1/300 in the above example. As such operation is done repeatedly, the sensitivity coefficient for dealing with the sensitivity error in the output signal of the gyro sensor 26 ultimately perfectly coincides with the sensitivity error, that is, the sensitivity error is perfectly corrected.

Figure 8:
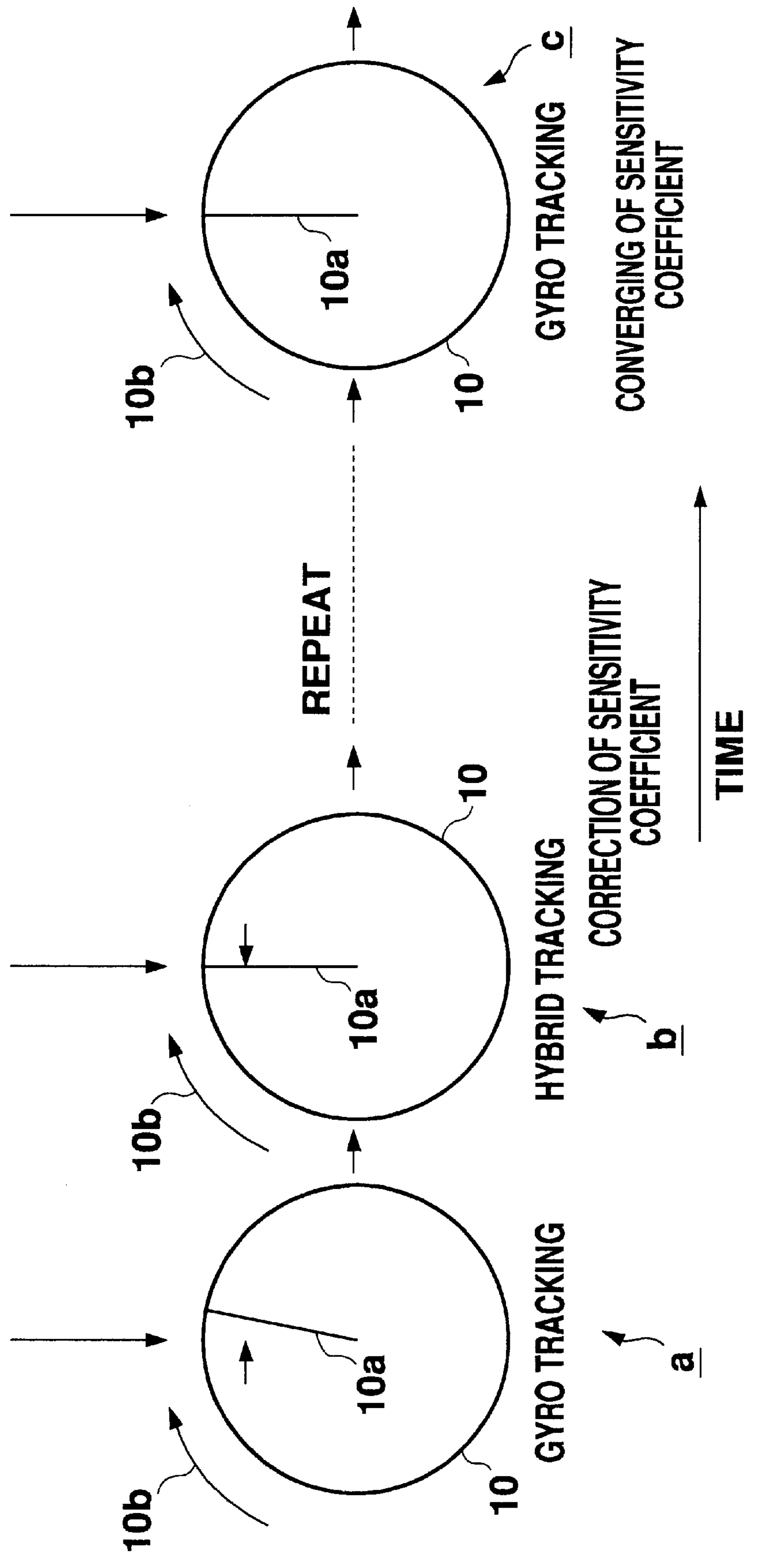
FIG. 8 is a view for explaining the principles underlying the sensitivity coefficient correction in the vehicle-mounted BS signal receiving system embodying the invention.

FIG. 8 illustrates a manner in which the sensitivity coefficient is corrected by interval correction so that the sensitivity error of the gyro sensor 26 is ultimately perfectly dealt with. Shown in a in FIG. 8 is a situation subsequent to the situation shown in d in FIG. 7. In this situation, like the situation shown in b in FIG. 7, the singular velocity of rotation of the antenna 10 has grown excessive due to an excessively high sensitivity of the gyro sensor 26 due to still insufficient sensitivity coefficient correction in the situation shown by c in FIG. 7, so that the correct value (equal to the sensitivity error in the output signal of the gyro sensor 26) has not yet been obtained. In the situation shown by b in FIG. 8, the hybrid tracking is triggered and the sensitivity coefficient of the gyro sensor 26 is again corrected.

As the correction is repeated, the sensitivity coefficient is ultimately converged to the same value as the sensitivity error in the output signal of the gyro sensor 26 as shown in c in FIG. 8.

As shown above, in this embodiment the sensitivity coefficient can be automatically corrected corresponding to a drift generated in the sensitivity error in the output signal of the gyro sensor 26, and it is thus possible to accurately make up for the sensitivity error.

B. Modifications of the Embodiment

B-1 In the basic embodiment described above, the sensitivity coefficient for dealing with the sensitivity error is corrected in a case when the received power level is temporarily reduced to be lower the threshold LB due to blocking of BS signal by trees or a building or the like and then increased again to be above the threshold LC. The sensitivity coefficient should not be corrected in the case of momentary received power level reduction due to such signal blocking. In order to prevent the sensitivity coefficient correction when the hybrid tracking is occurs due to such a momentary received power level reduction, it is sufficient that when the threshold power level LD (i.e., LB - ΔCNR (refer to FIG. 5)) was exceeded at least once during the past T seconds, the received power level reduction is judged to be due to transient blocking of the signal and the sensitivity coefficient is not corrected.

Figure 9:
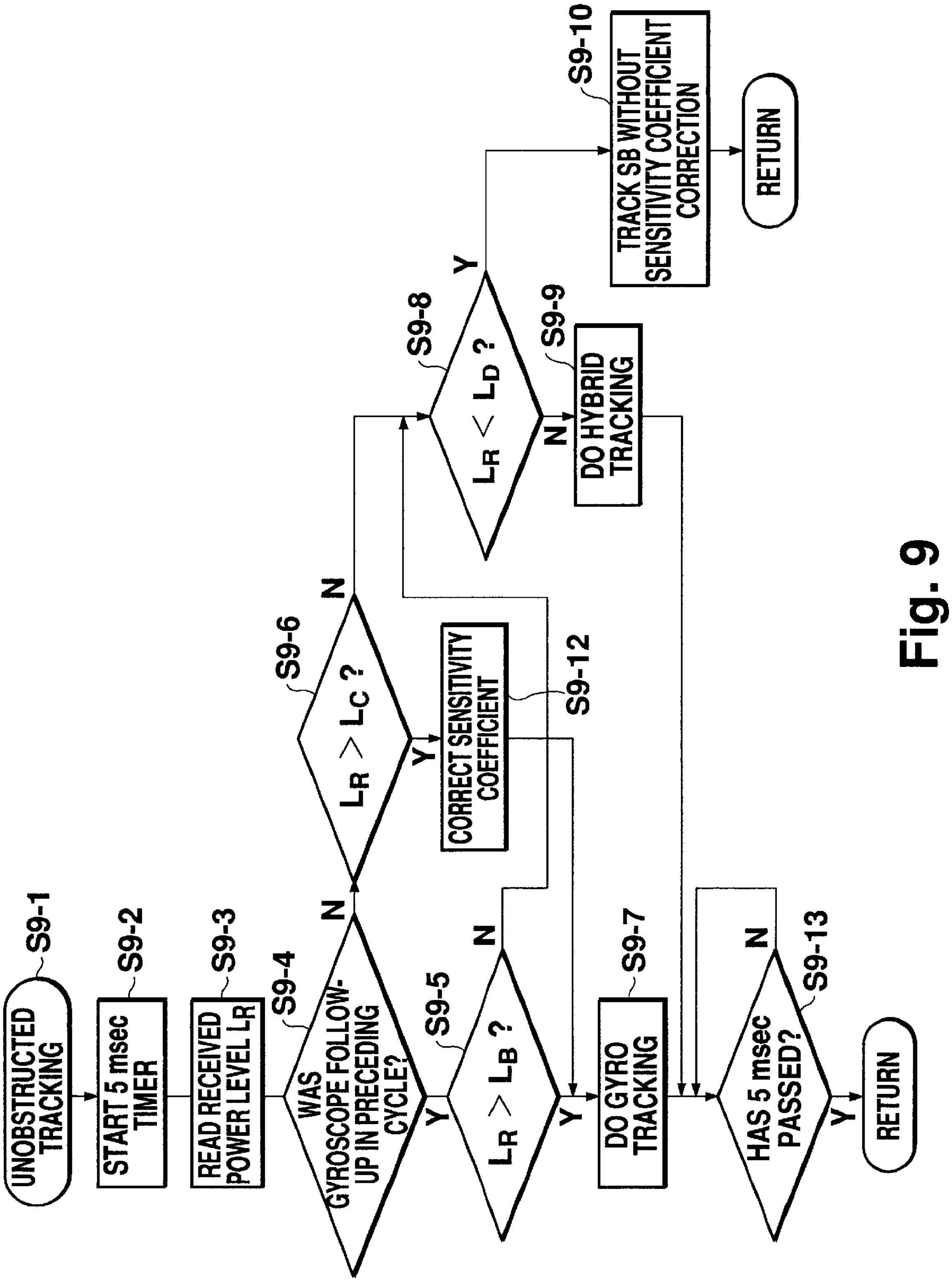
FIG. 9 is a flow chart illustrating a tracking operation in the vehicle-mounted BS signal receiving system embodying the invention.

FIG. 9 is a flow chart illustrating a tracking operation in a vehicle-mounted BS signal receiving system as Embodiment B-1. The routine shown in the flow charts starts, for the sake of convenience, from a state of receiving BS waves without being blocked by trees or the like (i.e., a state of unobstructed tracking) (step S9-1). In a step S9-2, a 5-msec timer is started. In the timer, the control interval Δt noted above for the gyro tracking is set.

In a step S9-3, the received power level LR is read. In a step S9-4, a check is made as to whether the gyro tracking was done in the preceding control (for the past 5 msec). When the gyro tracking was done, the routine goes to a step S9-5. Otherwise, the routine goes to a step S9-6.

In the step S9-5, a check is made as to whether the received power level is higher than the threshold power level LB. When the received power level is higher, the routine goes to a step S9-7 of executing the gyro tracking. Otherwise, the routine goes to a step S9-8. The step S9-7 is illustrated in detail in the flow chart of FIG. 10.

In the step S9-8, a check is made as to whether the received power level LR is lower than a the threshold level LD (i.e., LB - ΔCNR). When the received power level is not lower, the routine goes to a step S9-9 of executing the hybrid tracking. The step S9-9 is illustrated in detail in the flow chart of FIG. 11. Otherwise, the routine goes to a step S9-10.

In step S9-10, tracking is executed without correction of the sensitivity coefficient for dealing with the sensitivity error. In tracking without sensitivity coefficient correction, when the received power level is restored to be above the threshold LD within a predetermined period of time (for instance 10 sec), the unobstructed tracking state is brought about again (step S9-1). Unless the received power level is restored within the predetermined time, the operation from "power-"on" is repeated, that is, a reset state is brought about.

In the step S9-6, a check is made as to whether the received power level LR is higher than the threshold power level. When the received power level is higher, the routine goes to step S9-12 of correcting the sensitivity coefficient. Otherwise, step S9-8 is executed.

Subsequent to step S9-7 or step S9-9 of tracking, a final step S9-13, in which a check is made as to whether 5 msec has passed, is executed. The 5 msec corresponds to the control interval Δt in the gyro tracking as noted above.

Figure 10:
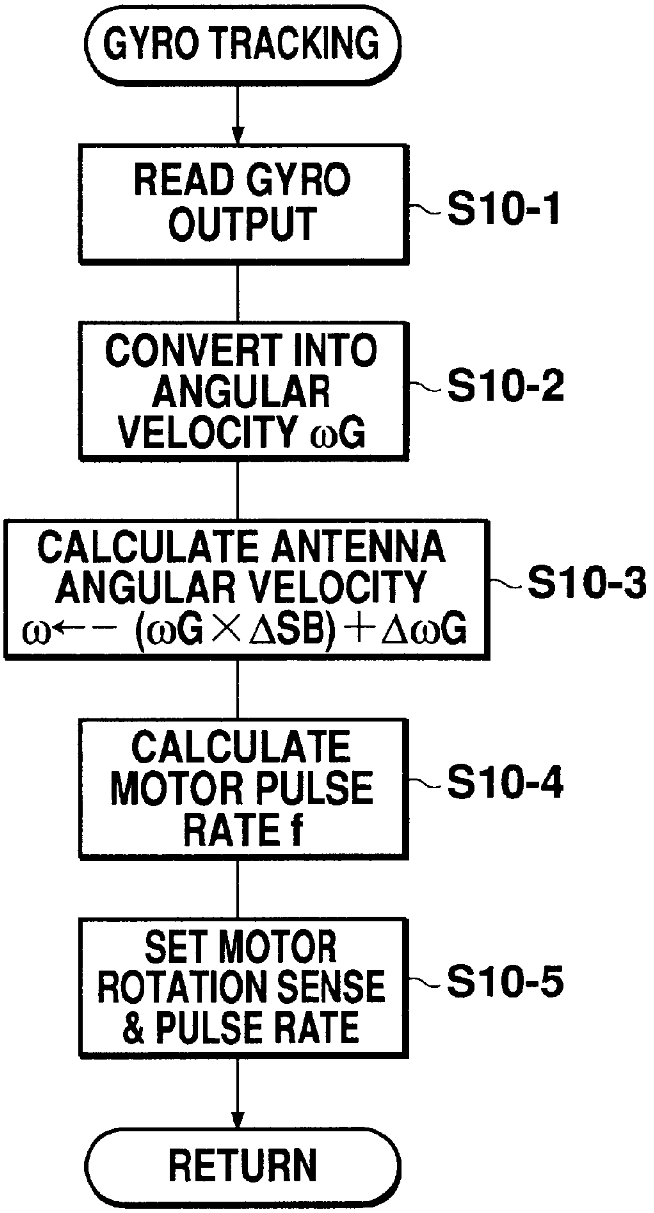
FIG. 10 is a flow chart illustrating a gyro tracking step in the flow chart shown in FIG. 9.

FIG. 10 is a flow chart illustrating the gyro tracking. In this routine, the gyro sensor output is read in a step S10-1. In a step S10-2, the output is converted to the angular velocity ωG. In a step S10-3, the angular velocity of the antenna is calculated. Specifically, the calculation is made as a)=−(ωG×ΔSB)+ΔωG where ΔSB is the sensitivity coefficient for correcting the output signal of the gyro sensor 26 to make up for the sensitivity error, and ΔωG is the correction value for correcting the output signal to make up for the offset error. The correct angular velocity of the vehicle in yawing is calculated as ωG×ΔSB−ΔωG. The angular velocity of the antenna is thus calculated as ω=−(ωG×ΔSB−ωG)=−(ωG×ΔSB)+ΔωG.

In a step 10-4, the motor pulse rate f is calculated. In a step S10-5, the motor rotation sense and pulse rate are set. The gyro tracking is done by the above operation.

Figure 11:
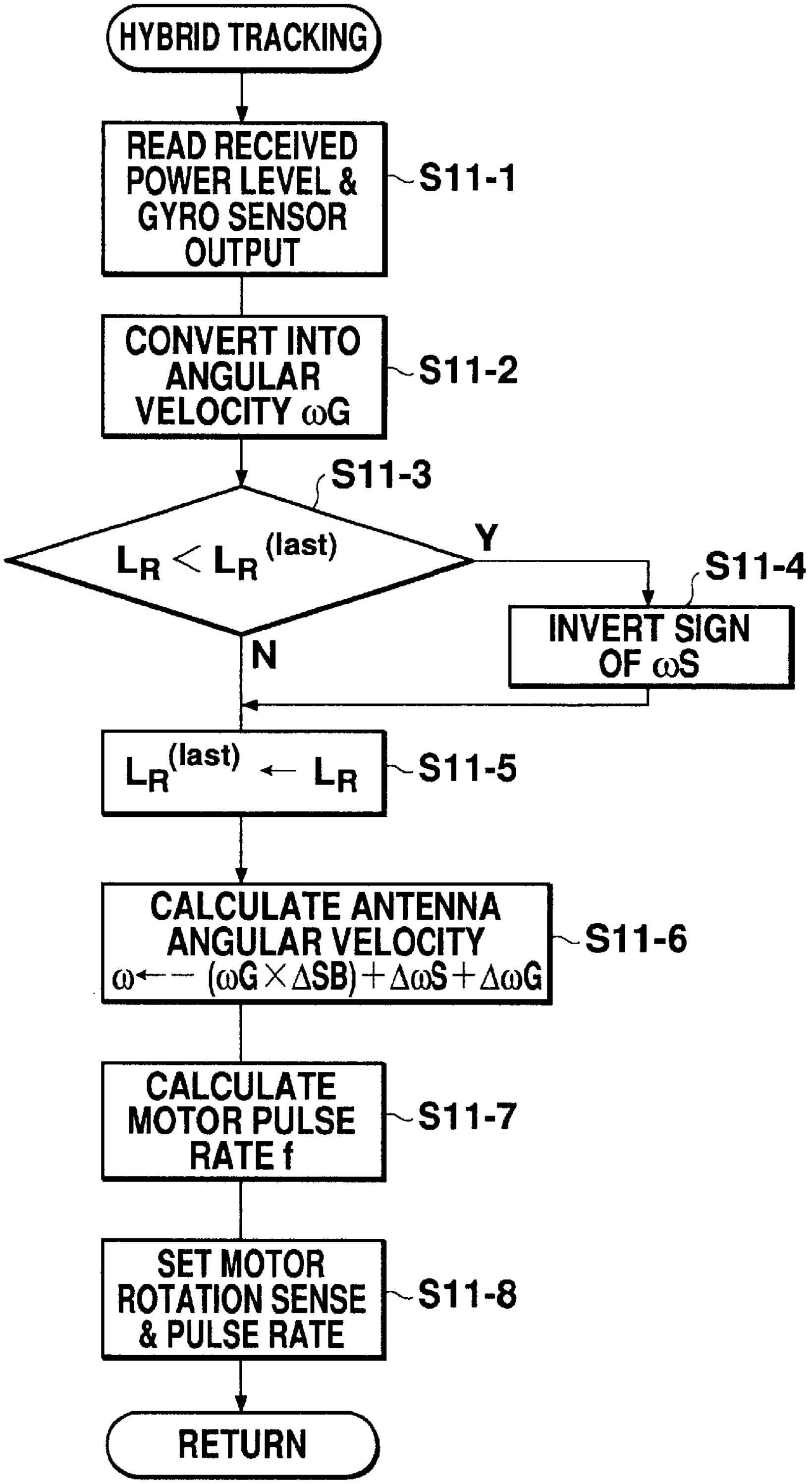
FIG. 11 is a flow chart illustrating a hybrid tracking step in the flow chart shown in FIG. 9.

FIG. 11 is a flow chart illustrating the hybrid tracking. In this routine, the received level LR and the gyro sensor output are read out in a step S11-1. In step S11-2, the gyro sensor output is converted into the angular velocity ωG. In step S11-3, the previously detected received power level $LR^{(LAST)}$ and the received power level LR detected this time are compared. When the received power level LR is lower than the previously detected value, the routine goes to a step S11-4 of inverting the sense of rotation in the step tracking, i.e., inverting the sign of ωS.

In a step S11-5, the received power level LR detected this time is preserved as $LR^{(LAST)}$ to be used for the next control, that is, $LR^{(LAST)}$ is updated. In a step S11-6, the angular velocity of the antenna is calculated. Specifically a calculation of ω=−(ωG×ΔSB)+ωS+ΔωG is made, in which ωG is the angular velocity obtained by conversion from the gyro sensor output, ΔSB is the sensitivity coefficient, ωS is the step rate, and Δω is the correction value for dealing with the offset error. In a step S11-7, the motor pulse rate f is calculated. In a step S11-8, the motor rotation sense and pulse rate are set. The hybrid tracking is done by the above operation.

B-2 In the basic embodiment described above, the correction value for making up the offset error may be corrected even when the received power level C/N is transiently reduced due to rolling or pitching of the vehicle. To prevent this, it is suitable to detect the rolling angle or pitching angle by providing a gyro sensor for detecting the rolling rate or pitching rate and prohibit the correction of the sensitivity coefficient for dealing with the sensitivity error even when the received power level C/N is reduced so long as the detected rolling angle or pitching angle is above a threshold angle. Theoretically, it can be judged that no pitching or rolling is present when the rolling rate or pitching rate is below a certain threshold. When and only when this is so (when no rolling or pitching is present), the sensitivity coefficient is corrected. In this way, it is possible to eliminate erroneous sensitivity coefficient correction.

With this arrangement, stable BS signal reception is possible irrespective of vehicle rolling or pitching.

B-3 In the basic embodiment of the vehicle-mounted BS signal receiving system described above, immediately after power-"on", the correction amount da by which the sensitivity coefficient ΔSB is corrected is very small compared to the difference between the sensitivity coefficient and the actual sensitivity error, which is large. Therefore, the sensitivity coefficient should be repeatedly corrected a number of times until it is converged to a correct value, which requires an amount of time.

On the other hand, the sensitivity coefficient once converged is desirable changed as little as possible. In Modification B-3, the correction unit Δα for one correction of the sensitivity coefficient is changed according to the extent of converging of the sensitivity coefficient.

The extent of converging can be defined in various standards, and can be detected using various means. For example, it is suitable to make the cycle of correction of the sensitivity coefficient for dealing with the sensitivity error as a reference of the extent of converging. To adopt such cycle as a reference, it is suitable to use a timer, which is re-started at each sensitivity coefficient correction timing. Such a timer is reset and restarted simultaneously with the reading of its value for every sensitivity coefficient correction. The read-out timer value is the "cycle of correction" of the sensitivity coefficient.

When the read-out cycle is longer than a predetermined threshold (that is, when the correction period is longer), it is judged that the sensitivity correction is near the converging, and the reference value Act of correction, i.e., the correction unit of one time of sensitivity coefficient correction, is set to a small value.

In other words, when the read-out cycle is not greater than a certain threshold, it is judged that the sensitivity coefficient is far apart from the converging, and the reference value Δα of correction is set to a large value.

Thus, when the correction is still far from the converging, quick correction can be permitted, while as the converging is approached more prudent correction can be made. It is thus possible to obtain more accurate correction of the sensitivity coefficient for dealing with the sensitivity error.

B-4 In the basic embodiment described above, while the detected yaw rate is low, the sensitivity error has greater influence than the offset error. While the detected yaw rate is high, on the other hand, the proportion of the sensitivity error in the total error is greater than that of the offset error.

Accordingly, in the basic embodiment the sensitivity coefficient is corrected when and only when the yaw rate is greater than a predetermined range Y. In other words, when the yaw rate is greater than Y deg/sec, it is considered that the offset error is less than the sensitivity error and therefore ignorable, and in the embodiment the sensitivity coefficient is corrected. The range Y (deg/sec) will be specifically determined for each case on the basis of experiments or the like.

B-5 In the above Modification B-4, the proportions of the sensitivity error and offset error are judged with the yaw rate Y (deg/sec) as a threshold. To increase the opportunity of the sensitivity coefficient correction, N as small a Y as possible is desirable. The correction of the correction value for dealing with the offset error and the sensitivity coefficient for dealing with the sensitivity error, may both be made by changing the threshold yaw rate Y (deg/sec) according to the extent of converging of the correction value for dealing with the offset error.

Specifically, with the progress of converging of the correction value for dealing with the offset error, the influence of the offset error in the output signal of the gyro sensor 26 is reduced, and Y is desirably reduced. Conversely, when the offset error in the gyro sensor output signal is greatly influential without substantial progress of the offset error correction value correction, a large value of Y is suitably set In other words, the value of Y is desirably set to be large when much offset error is contained in the gyro sensor output signal with insufficient offset error correction value correction, and reduced as the correction of the offset error correction value converges.

Figure 12:
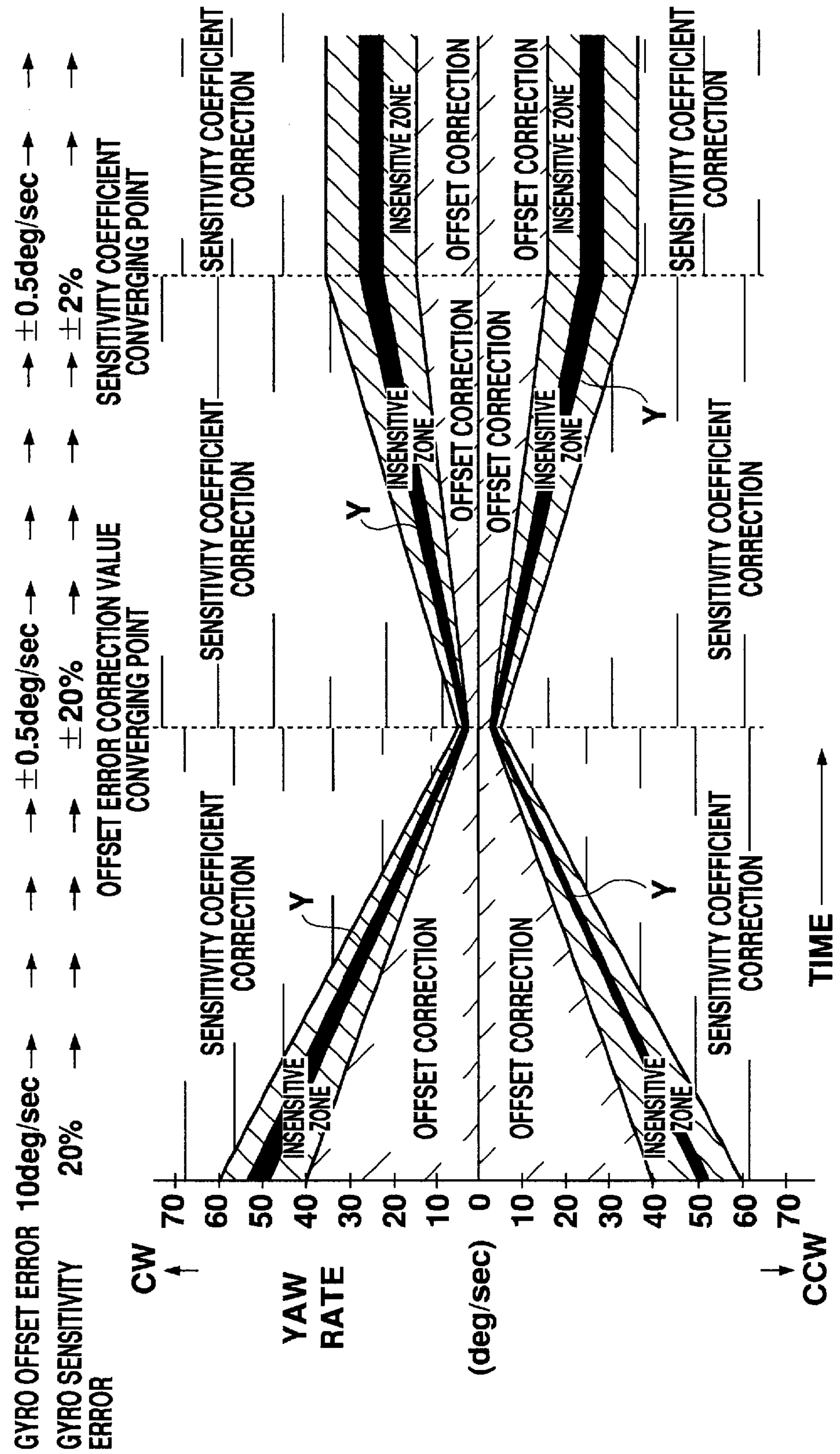
FIG. 12 is a graph showing changes in the offset error correction value, threshold Y and sensitivity coefficient in the vehicle-mounted BS signal receiving system embodying the invention.

The operation of this modification will now be described specifically with reference to the graph shown in FIG. 12. FIG. 12 shows the extent of converging of the offset error correction value, manner of changes in the threshold yaw rate and manner of converging of the sensitivity coefficient in the modification of the vehicle-mounted BS signal receiving system. In the graph, the ordinate is taken for the yaw rate, and the abscissa is time.

Right after power-“on”, Y is 50 deg/sec. This means that the sensitivity coefficient is corrected when the yaw rate of the vehicle is 50 deg/sec or below, while the offset error correction value correction is made when the yaw rate is below 50 deg/sec. A yaw rate range of approximately 20% centered on Y is defined as an “insensitive zone”. When the yaw rate is in this insensitive zone, neither the sensitive coefficient correction nor the offset error correction value correction is made.

While in this modification the “insensitive zone” of approximately 30% centered on Y is defined, it is of course possible to provide no insensitive zone. An arrangement without provision of any insensitive zone has the same function as the fourteenth or fifteenth aspects of the invention. When no insensitive zone is provided, only a single reference yaw rate may be adopted as reference for the judgment, thus facilitating the judgment and control.

In the example shown in FIG. 12, the offset error and sensitivity error in the output signal of the gyro sensor 26 are 10 deg/sec and 20%, respectively.

When switching from the gyro tracking over to the hybrid tracking is provided, the correction of the offset error correction value (shown as “Offset correction” in FIG. 12) or the correction of the sensitivity coefficient (shown as “Sensitivity correction” in FIG. 12) is made.

In the example shown in FIG. 12, the vehicle underwent no great yawing for a constant period right after the power-“on”, so that only the offset error correction value was corrected. As a result, as shown in an upper part of the graph shown in FIG. 12, at the offset error correction value converging point, substantially perfect correction of the offset error correction value was attained, thus holding the virtual offset error within 0.5 deg/sec. The sensitivity coefficient, on the other hand, was not corrected at all, and the sensitivity error was the same value of 20% as right after the power-“on”.

As shown in FIG. 12, the correction of the offset error correction value proceeded until the offset error correction value converging point after the “power’-“on”. On the other hand, the threshold yaw rate Y reduced substantially linearly because in this modification the threshold yaw rate Y is changed according to the extent of converging of the offset error correction value.

In the graph of FIG. 12, the sensitivity coefficient is not corrected until reaching of the offset error correction value converging point. However, accurate correction of the sensitivity coefficient is possible with changes in the threshold Y before the converging of the offset error correction value.

At the offset error correction value converging point, the threshold yaw rate Y is excessively low, so that even a slight yawing of the vehicle would cause the yaw rate thereof to exceed the threshold and get into the “insensitive zone”. Consequently, after the offset error correction value converging point had passed, mostly sensitivity coefficient correction is done, causing the sensitivity coefficient to converge. In this modification, the threshold yaw rate is changed according to the extent of convergence of the sensitivity coefficient The yaw rate should be determined according to the ratio between the offset error and the sensitivity error, and this rate is changed according to the extent of converging of the sensitivity coefficient. Accordingly, the threshold yaw rate Y is changed according to the extent of converging of the sensitivity coefficient.

With the progress of the sensitivity coefficient correction in this way, the sensitivity coefficient was reduced to 2% at the sensitivity coefficient converging point shown in FIG. 12.

B-6 In the operation example shown in FIG. 12, right after the power-“on” only the offset error correction value is corrected, and it is afterwards that the sensitivity coefficient correction is brought about. Suitably, such an operation is executed independently of the yaw rate.

That is, the sensitivity coefficient correction is made only after zero point correction made when the vehicle is stopped or turns to run straight. With the offset error correction value correction and the sensitivity coefficient correction made perfectly distinctively, it is possible to obtain accurate sensitivity coefficient correction.

Figure 13:
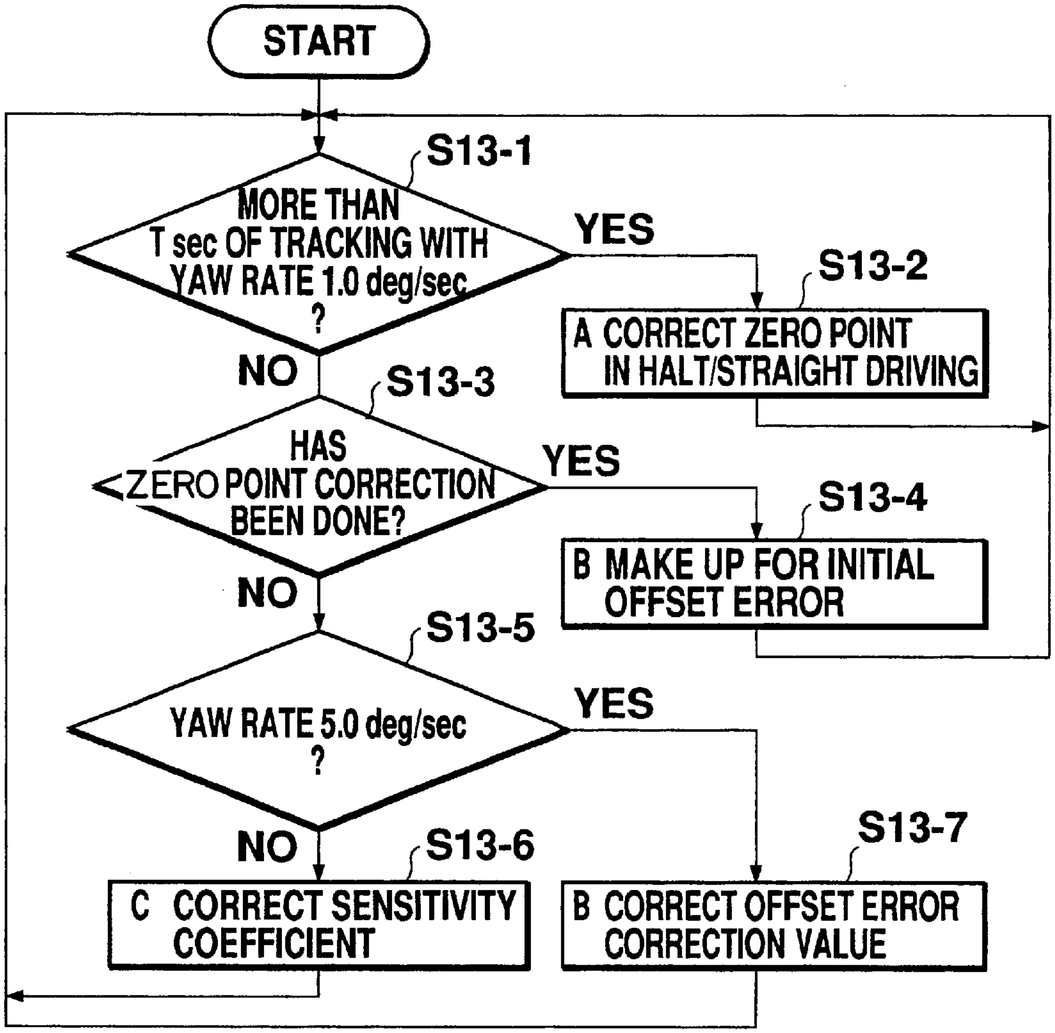
FIG. 13 is a flow chart illustrating an operation of sensitivity coefficient correction after converging of offset error correction value in the vehicle-mounted BS signal receiving system embodying the invention.

FIG. 13 is a flow chart illustrating the operation in modification B-6 of the vehicle-mounted BS signal receiving system.

In a step S13-1, a check is made as to whether step tracking (with a step rate of approximately 1.5 deg/sec) has been continued at a yaw rate beyond a range of 1.0 deg/sec. for more than T sec. When the result of this check is “YES”, it is determined that the vehicle is at a halt or running straight, and the routine goes to a step S13-2. In the step S13-2, the zero point correction is done. The routine then goes back to the step S13-1.

When the result of the check in the step SD13-1 is “NO”, the routine goes to a step S13-3. In the step S13-1, a check is done as to whether the zero point correction has been done. When the zero point correction has not yet been done, the routine goes to a step S13-4 of making up for initial offset error. The initial offset error is made up for whenever the hybrid tracking is switched over to the gyro tracking. After zero point correction has been done, the sum of offset error corrections is added to the offset error correction value for every predetermined time of T' sec., that is, correction to be added to the offset error correction value is done collectively for T' seconds.

When it is not determined in step S13-3 that the zero point correction has not been done, the routine goes to a step S13-5 of checking whether the yaw rate of the vehicle is within range of ±5.0 deg/sec. When it is determined as a result of the check that the yaw rate of the vehicle is within that range, the routine goes to a step S13-6 of sensitivity coefficient correction. When the yaw rate of the vehicle is not within the range of ±5.0 deg/sec, the routine goes to a step S13-7 of the offset error correction value correction.

The yaw rate range of ±5.0 deg/sec in the step S13-3 is a threshold as to whether to make the sensitivity coefficient correction or the offset error correction value correction. Again in this modification, like the previous modification, it is suitable to change the threshold according to the extent of converging of the offset error correction value or the like. In addition, it is suitable to provide an insensitive zone as in the case of FIG. 12 described above to permit accurate correction of the sensitive coefficient.

Figure 14:
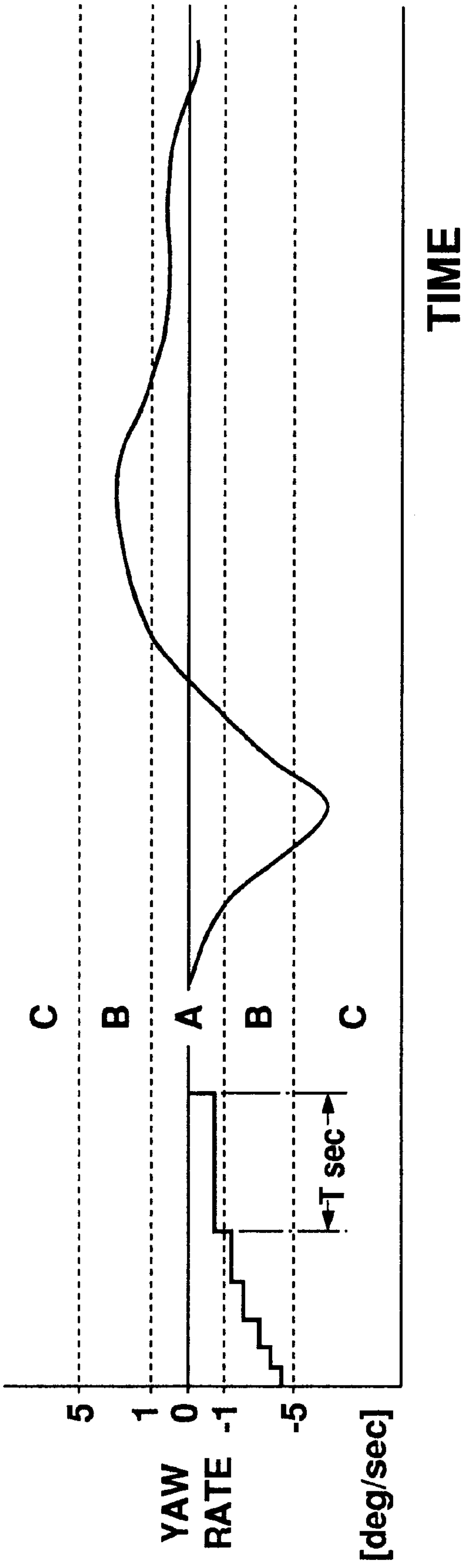
FIG. 14 is a graph showing the yaw rate in the operation shown in FIG. 13.
Figure 15:
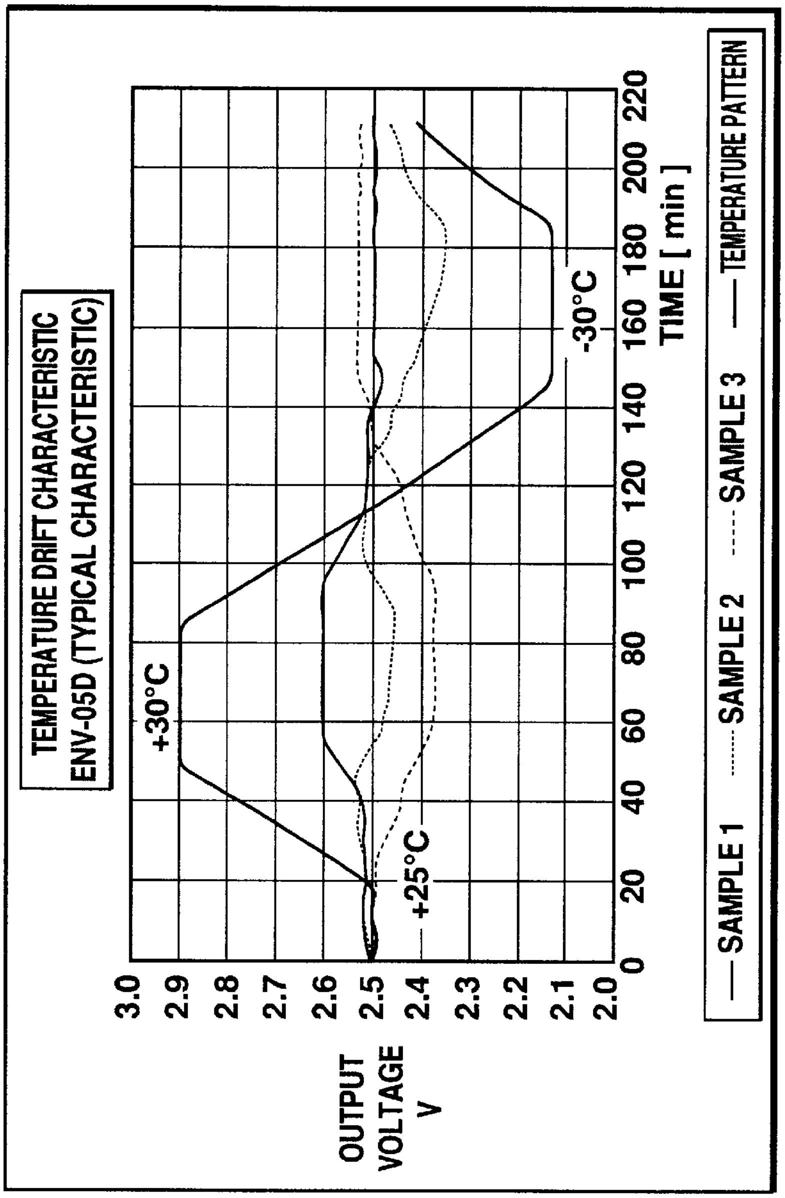
FIG. 15 is a flow chart showing the temperature drift in a gyro sensor.
Figure 16:
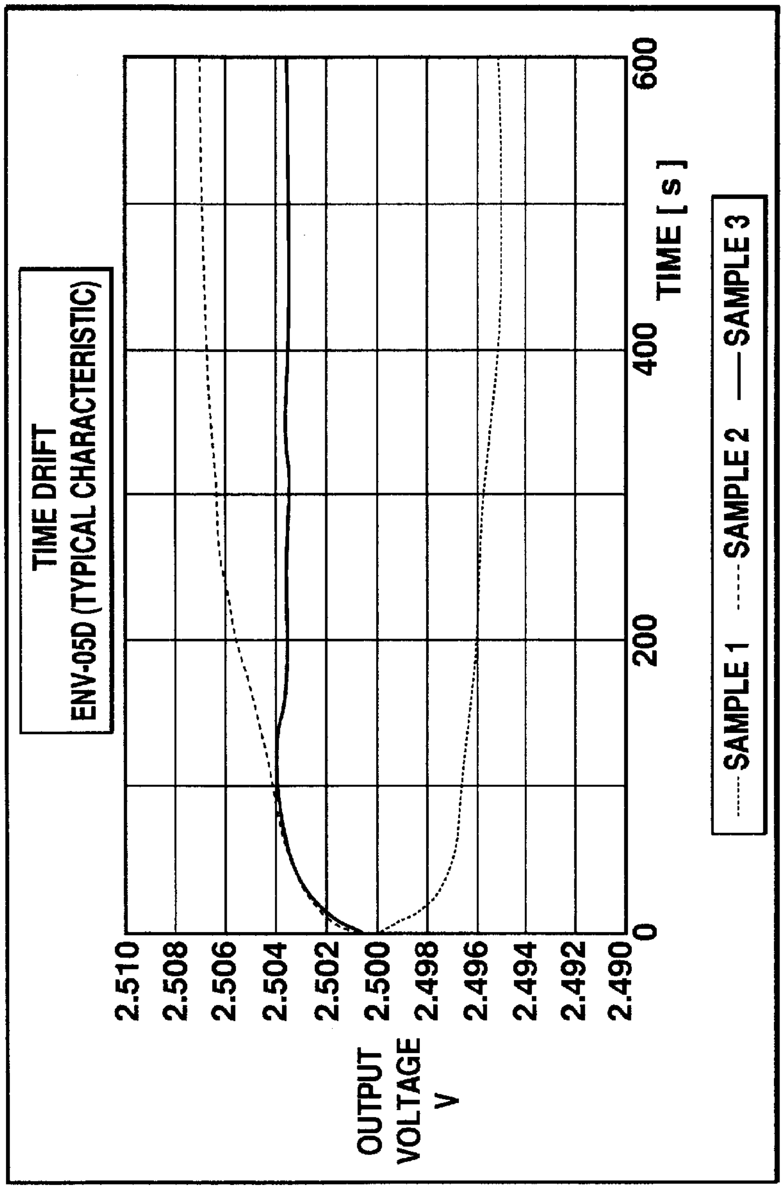
FIG. 16 is a flow chart showing the time drift in a gyro sensor.

FIG. 14 is a graph showing the yaw rate in Modification B-6. Shown at A is a region in which the zero point correction is done when the vehicle is at a halt or running straight (step S13-2), at B a region in which the initial offset error is made up for (step S13-4), and at C is a region in which the sensitivity coefficient correction is done (step S13-6). In the graph, the ordinate shows yaw rate of the vehicle, while the abscissa shows time.

B-7 In the basic embodiment described before, after the sensitivity coefficient has been converged, its correction is done at the timing of the transition from the gyro tracking to the hybrid tracking (or transition from the hybrid tracking back to the gyro tracking). However, the correction of the sensitivity coefficient every time after the converging, would lead to great sensitivity coefficient variations and may result in variations of the receiving state. Accordingly, after converging, it is suitable to accumulate corrections for each unit yaw angle ΔY (deg), for instance 90 and determine the correction value of the sensitivity coefficient for each unit yaw angle ΔY.

B-8 In this modification, it is sought to maintain the sensitivity error to within 2%. In other words, when the sensitivity error is within 2%, the sensitivity error is judged to have been converged. In Embodiment B-7, it is suitable to make correction by one to two times Δα (sensitivity coefficient correction unit) when and only when the error accumulation for every ΔY is n (n being an integer of 1 or above) times Δα.

B-9 In Embodiment B-3 described above concerned, the sensitivity coefficient correction unit was changed according to the extent of converging of the sensitivity coefficient. In this mode, it is possible to obtain quick converging of the sensitivity coefficient and accurate correction thereof. When such correction is mostly to "increase" the sensitivity coefficient, it is predicted that the sensitivity coefficient is considerably smaller than the correct value. Thus, when the correction is mostly in the "increase" direction increasing the correction unit is suitable for rapid converging of the sensitivity coefficient.

In a converse case when the sensitivity coefficient is corrected mostly in the "decrease"0 direction, it is predicted that the sensitivity coefficient is considerably greater than the correct value. In this case, it is desirable to increase the sensitivity coefficient correction unity as in the above case.

It will be appreciated that the correction unit is increased when the sensitivity coefficient correction is mostly in the either "increase" or "reduction" directions.

In modification B-9, the "extent of converging" is detected in dependence on whether the correction is mostly in either direction. Since it is possible to judge whether the sensitivity coefficient is greatly set apart from the correct value in the above way with a simple construction, it is possible to readily obtain the same effects as in Modification B-3.

As has been described in the foregoing, according to the first aspect of the invention it is possible to obtain a vehicle-mounted BS signal receiving system which permits efficient correcting of a drift of the sensitivity coefficient for dealing with the gyro sensor output signal sensitivity error, and a satisfactory receiving state can always be maintained.

According to the second aspect of the invention whether to "increase" or "reduce" the sensitivity coefficient can be readily judged, and it is thus possible to provide a vehicle-mounted BS signal receiving system which is capable of continuing stable signal reception.

According to the third aspect of the invention, it is possible to provide a vehicle-mounted BS signal receiving system, which can correct the sensitivity coefficient without being adversely affected by the offset error.

According to the fourth aspect of the invention, while obtaining the effects according to the third aspect of the invention, it is possible to provide a vehicle-mounted BS signal receiving system which can correct the offset error correction value without being adversely affected by the sensitivity error.

According to the fifth aspect of the invention, the threshold value of judging the correction is updated according to the extent of converging of the offset error correction value, and it is possible to efficiently carry out the third and fourth aspects of the invention.

According to the sixth aspect of the invention, it is possible to obtain a vehicle-mounted BS signal receiving system, which can continue stable signal reception even when BS signal is transiently blocked by trees or the like.

According to the seventh aspect of the invention, it is possible to provide a vehicle-mounted BS signal receiving system, in which the sensitivity coefficient is not erroneously corrected with respect to a sensitivity error drift irrespective of rolling or pitching.

According to the eighth aspect of the invention, the correction unit is set differently before and after the converging of the sensitivity coefficient, and it is thus possible to provide a vehicle-mounted BS signal receiving system, which is capable of stable sensitivity coefficient correction while realizing quick converging.

According to the ninth and tenth aspects of the invention, the sensitivity coefficient is corrected after the offset error correction value has been corrected, and it is thus possible to corrected the sensitivity coefficient without being adversely affected by the offset error.

According to the eleventh aspect of the invention, it is made difficult to correct the sensitivity coefficient after the converging thereof, and it is thus possible to obtain a vehicle-mounted BS signal receiving system, which is capable of stable BS signal reception.

According to the twelfth aspect of the invention, the yaw rate as a reference of judgment as to whether to correct the offset error correction value or correct sensitivity coefficient, and it is thus possible to obtain as vehicle-mounted BS signal receiving system, which can always make correct judgment and realize a satisfactory receiving state.

According to the thirteenth aspect of the invention, it is possible to provide a vehicle-mounted BS signal receiving system, which is capable of causing quick converging of the sensitivity coefficient and realizing a satisfactory receiving state.

According to the fourteenth and fifteenth aspects of the invention, only a single reference yaw rate is used for control, and it is thus possible to provide a vehicle-mounted BS signal receiving system, which has a simple construction.

What is claim:

1. A vehicle-mounted satellite signal receiving system comprising:

an antenna mounted on a vehicle;

a gyro sensor for detecting the rotational angular velocity of said vehicle and outputting an output signal, said output signal having an offset error and a sensitivity error;

a sensitivity error correcting means for correcting the output signal of said gyro sensor to make up for said sensitivity error of said output signal separately from said offset error by multiplying said gyro sensor output signal by a sensitivity coefficient and outputting a corrected gyro sensor output signal;

gyro tracking means for controlling the bearing of said antenna according to said corrected gyro sensor output signal; and sensitivity coefficient correcting means for determining whether a correction of said sensitivity error of the gyro sensor by said sensitivity error correcting means is appropriate when a received power level of a satellite signal received by said antenna is reduced from a previous level, and correcting said sensitivity coefficient it if is appropriate to do so.

2. A vehicle-mounted satellite signal receiving system comprising:

a vehicle-mounted antenna;

a gyro sensor for detecting the rotational angular velocity of a vehicle and outputting an output signal, said output signal having an offset error and a sensitivity error, a sensitivity error correcting means for correcting the output signal of said gyro sensor to make up for a sensitivity error of said output signal of signal gyro sensor by multiplying said gyro sensor output signal by a sensitivity coefficient and outputting a corrected gyro sensor output signal;

gyro tracking means for controlling the bearing of said antenna according to said corrected gyro sensor output signal when a received power level of a satellite signal received by said antenna is above a first predetermined power level;

step tracking means for controlling the bearing of said antennas the control provided by said step tracking means enabling said received power level of said satellite signal to be increased when it is below a second predetermined power level; and sensitivity coefficient correcting means for comparing, when the control of the bearing of said antenna by said step tracking means results from the reduction of said received power level being below said second predetermined power level, an antenna rotation direction during the control by said step tracking means and the antenna rotation direction during the control by said gyro tracking means, and correcting said sensitivity coefficient by a predetermined amount of reduction if the two antenna rotation directions are different, and correcting said sensitivity coefficient by a predetermined amount of increment if the two antenna rotation directions are the same.

3. The vehicle-mounted satellite signal receiving system according to one of claims 1 and 2, which further comprises:

yaw rate calculating means for calculating the yaw rate of said vehicle;

said sensitivity coefficient correcting means correcting said sensitivity coefficient when and only when said yaw rate is above a first reference yaw rate Y1.

4. The vehicle-mounted satellite signal receiving system according to claim 3, which further comprises:

offset error correcting means for correcting said gyro sensor output signal to make up for said offset error by adding a predetermined offset error correction value to said gyro sensor output signal; and correction value correcting means for correcting said offset error correction value when and only when said yaw rate is below a second reference yaw rate Y2.

5. A vehicle-mounted satellite signal receiving system according to claim 4, which further comprises:

first reference yaw rate updating means for updating either one or both of said first and second reference yaw rates Y1 and Y2 according to the extent of converging of said offset error correction value.

6. The vehicle-mounted satellite signal receiving system according to claim 2, wherein:

said sensitivity coefficient correcting means corrects said sensitivity coefficient when and only when the time during which said received power level is above a third predetermined power level is longer than a predetermined time.

7. The vehicle-mounted satellite signal receiving system according to claim 2, which further comprises:

rolling/pitching detecting means for detecting rolling or pitching of said vehicle;

said sensitivity coefficient correcting means correcting said sensitivity coefficient when and only when said rolling/pitching means does not detect any rolling or pitching.

8. The vehicle-mounted satellite signal receiving system according to claim 2, which further comprises:

correction unit setting means for setting a correction unit for the correction of said sensitivity coefficient by said sensitivity coefficient correcting means according to the extent of converging of said sensitivity coefficient.

9. The vehicle-mounted satellite signal receiving system according to one of claims 1 or 2, which further comprises:

offset error correcting means for correcting said gyro sensor output signal to make up for said offset error thereof by adding a predetermined correction value to said gyro sensor output signal;

offset error correction value correcting means for correcting said offset error correction value; and control means for starting said sensitivity coefficient correcting means after said correction of said offset error correction value has been converged.

10. The vehicle-mounted satellite signal receiving system according to claim 4, which further comprises:

control means for starting said sensitivity coefficient correcting means after said correction of said offset error correction value has been converged.

11. The vehicle-mounted satellite signal receiving system according to one of claims 1 or 2, which further comprises:

control means for reducing the frequency of correcting said sensitivity coefficient after the correction of said sensitivity coefficient by said sensitivity coefficient correcting means;

said frequency reduction decreases the frequency of correcting from a value existing just prior to the correction of said sensitivity coefficient.

12. The vehicle-mounted satellite receiving system according to claim 3, which further comprises:

second reference raw rate updating means for updating said reference yaw rate according to the extent of converging of said sensitivity coefficient.

13. The vehicle-mounted satellite signal receiving system according to claim 8, which further comprises:

correction unit increasing means for increasing said correction unit when the correction of said sensitivity coefficient for dealing with said sensitivity error per unit time is substantially smaller or larger than a correct value.

14. The vehicle-mounted satellite signal receiving system according to claim 4, wherein:

said first and second reference yaw rates are the same.

15. The vehicle-mounted satellite signal receiving system according to claim 12, wherein:

said first and second reference yaw rates are the same.

* * * * *